US012415555B2

(12) United States Patent
Armbruster et al.

(10) Patent No.: US 12,415,555 B2
(45) Date of Patent: Sep. 16, 2025

(54) CLEANING CART

(71) Applicant: ALFRED KÄRCHER SE & CO. KG, Winnenden (DE)

(72) Inventors: Patrick Armbruster, Winnenden (DE); Jochen Burchard, Winnenden (DE); Denis Dammköhler, Winnenden (DE); Kamila Dobler, Winnenden (DE); Beyza Guegercin, Winnenden (DE); Marten Jahn, Winnenden (DE); Jens Kuhn, Winnenden (DE); Calogero Maniscalco, Winnenden (DE)

(73) Assignee: ALFRED KÄRCHER SE & CO. KG, Winnenden (DE)

(*) Notice: Subject to any disclaimer, the term of this patent is extended or adjusted under 35 U.S.C. 154(b) by 420 days.

(21) Appl. No.: 18/050,369

(22) Filed: Oct. 27, 2022

(65) Prior Publication Data
US 2023/0182796 A1    Jun. 15, 2023

Related U.S. Application Data

(63) Continuation of application No. PCT/EP2021/058284, filed on Mar. 30, 2021.

(30) Foreign Application Priority Data

Apr. 29, 2020 (DE) ............ 10 2020 111 731.0

(51) Int. Cl.
B62B 3/00      (2006.01)
A47L 13/51     (2006.01)
B62B 5/00      (2006.01)

(52) U.S. Cl.
CPC ............ *B62B 3/005* (2013.01); *A47L 13/51* (2013.01); *B62B 3/004* (2013.01); *B62B 5/0096* (2013.01); *B62B 2202/50* (2013.01)

(58) Field of Classification Search
CPC ....... B62B 3/005; B62B 3/004; B62B 5/0096; B62B 2202/50; A47L 13/51
See application file for complete search history.

(56) References Cited

U.S. PATENT DOCUMENTS 10,029,718 B2 *  7/2018  Benning ............... B62B 3/003
2011/0133417 A1  6/2011  Rouillard et al.
(Continued)

FOREIGN PATENT DOCUMENTS

CN    202445473    9/2012
CN    206166275    5/2017
(Continued)

OTHER PUBLICATIONS

International Search Report and Written Opinion for International (PCT) Patent Application No. PCT/EP2021/058284, dated Nov. 4, 2021, 13 pages.
(Continued)

Primary Examiner — Jacob B Meyer
(74) Attorney, Agent, or Firm — Sheridan Ross P.C.

(57) ABSTRACT

The invention relates to cleaning cart, comprising a frame having a frame lower part, a frame upper part and support parts which connect the frame lower part to the frame upper part and are spaced apart from one another, rollers at the frame lower part for moving on a ground surface, storage devices for receiving therein and/or supporting thereon cleaning accessories, retaining elements for holding the storage devices, and receiving elements arranged at the support parts in a predefined position, wherein the retaining elements are selectively fixable to the receiving elements for having the storage devices assume different relative positions with respect to the support parts.

36 Claims, 22 Drawing Sheets

(56) References Cited

U.S. PATENT DOCUMENTS

| | | | |
|---|---|---|---|
| 2014/0049014 A1 | 2/2014 | Schumacher et al. | |
| 2016/0332651 A1* | 11/2016 | Benning | ............... B62B 3/003 |
| 2018/0103820 A1 | 4/2018 | Menzel et al. | |
| 2023/0182796 A1* | 6/2023 | Armbruster | ............. A47L 13/51 |
| | | | 280/47.35 |

FOREIGN PATENT DOCUMENTS

| | | | |
|---|---|---|---|
| CN | 210300213 | 4/2020 | |
| DE | 3247135 | 6/1984 | |
| DE | 8430997 | 1/1985 | |
| DE | 10047352 | 6/2002 | |
| DE | 20-2004-000404 | 6/2004 | |
| EP | 1190664 | 3/2002 | |
| EP | 1437283 | 7/2004 | |
| EP | 1512606 | 3/2005 | |
| EP | 2314497 | 4/2011 | |
| EP | 3072776 | 9/2016 | |
| EP | 3208174 | 8/2017 | |
| FR | 2716661 | 9/1995 | |
| IT | MI20100965 | 11/2011 | |
| WO | WO-2010051841 A1 * | 5/2010 | ............. A47B 81/02 |
| WO | WO-2021165520 A1 * | 8/2021 | ............ A47L 9/0009 |
| WO | WO-2021219313 A1 * | 11/2021 | ............. A47L 13/51 |

OTHER PUBLICATIONS

Search Report for Germany Patent Application No. 10-2020-111731. 0, dated Apr. 29, 2020, 7 pages.

* cited by examiner

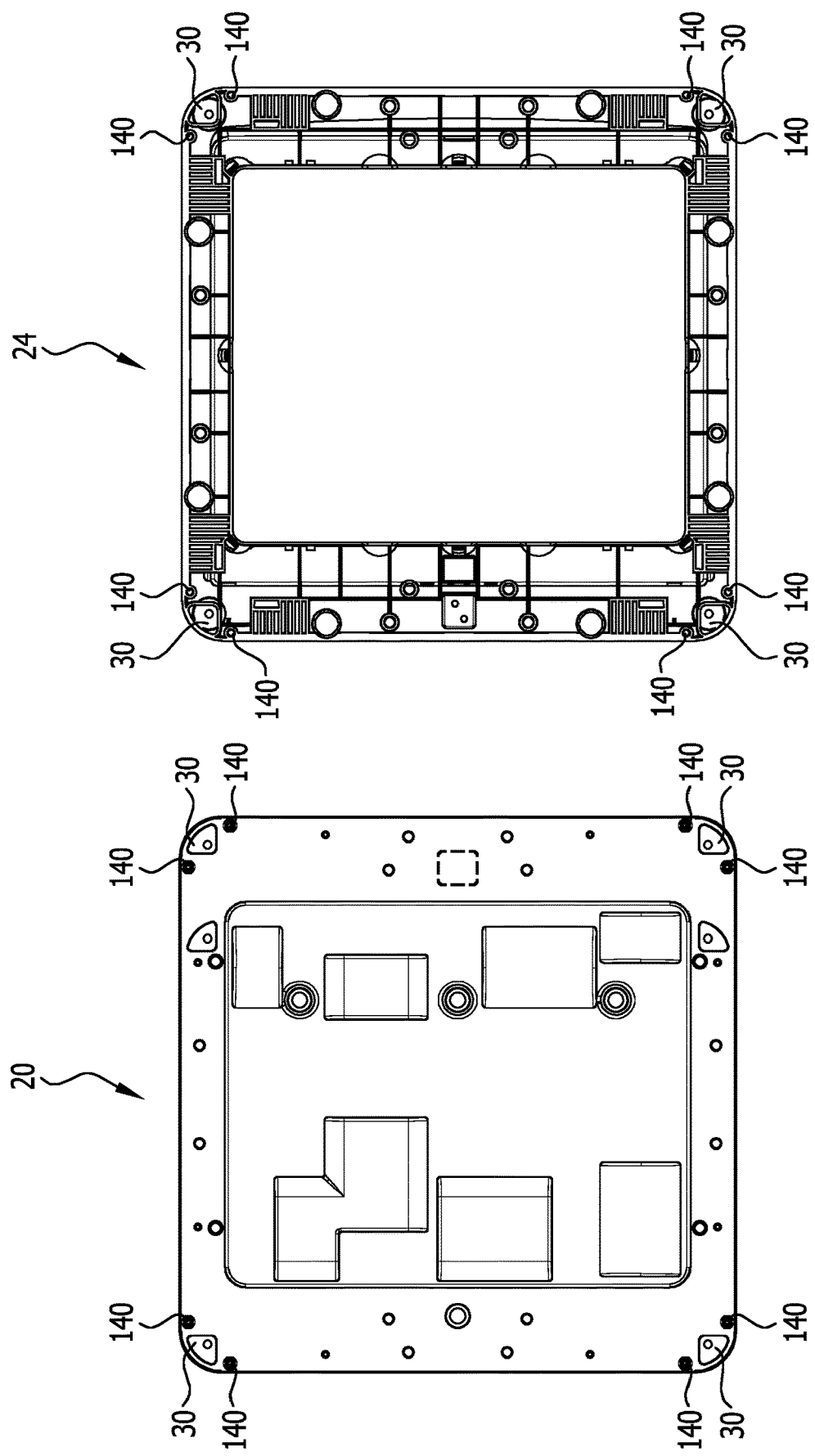

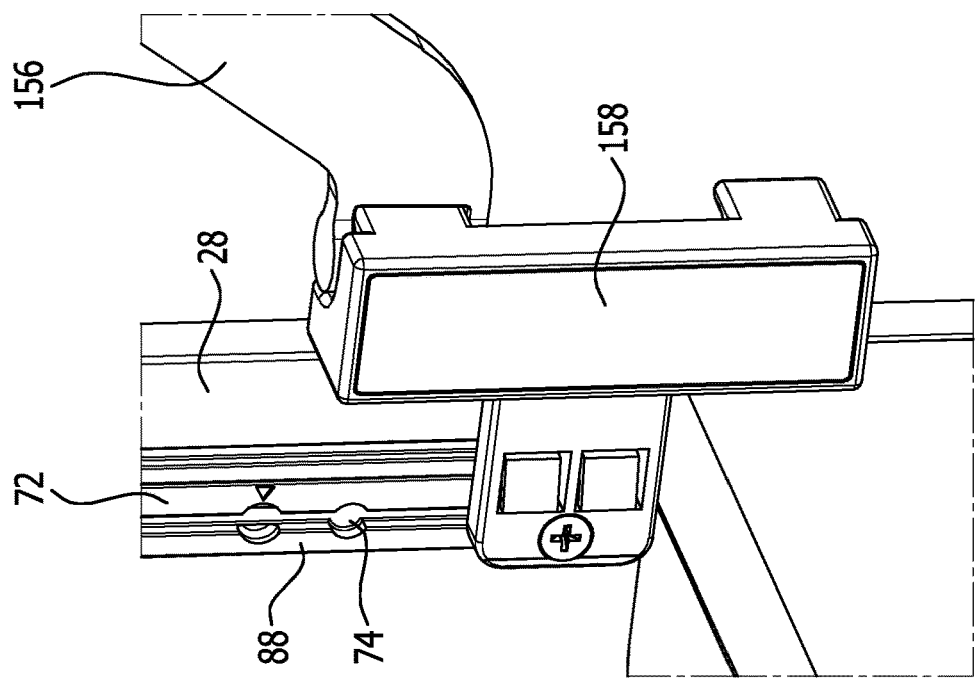
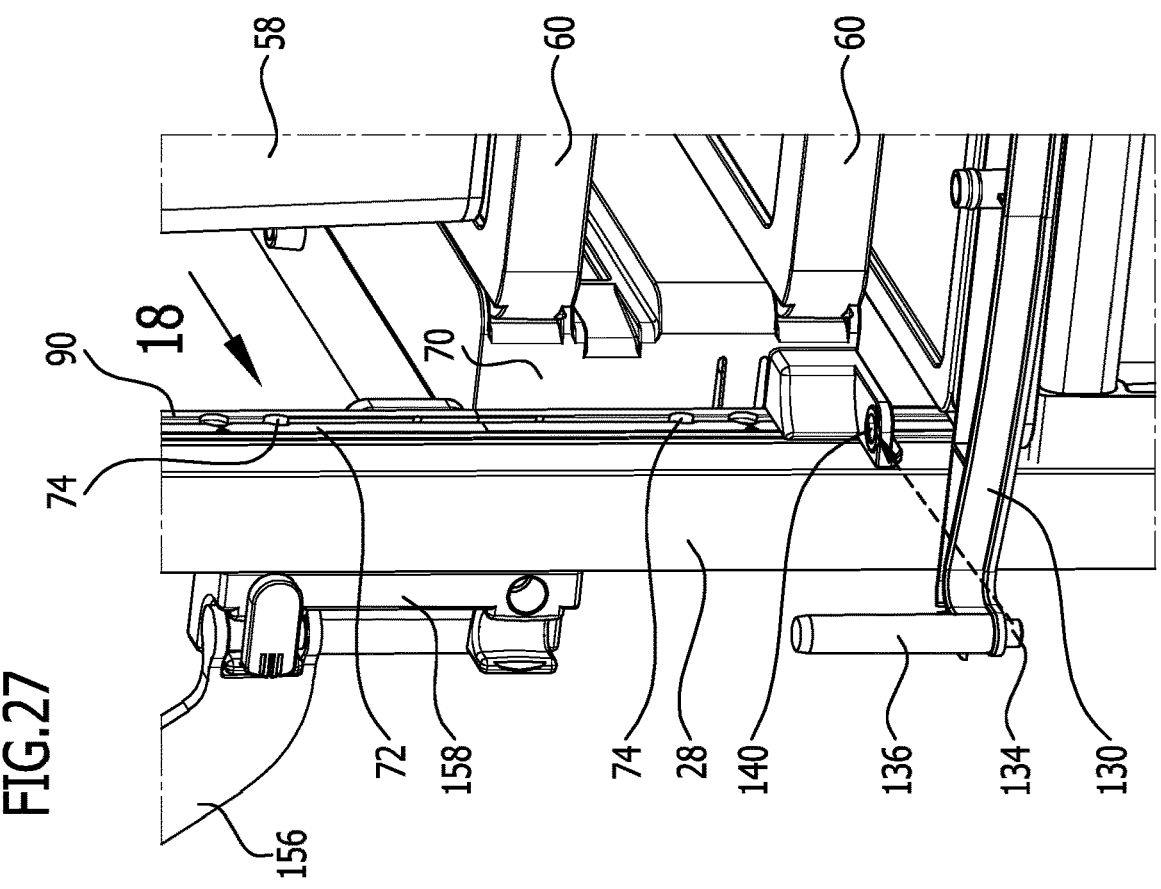

CLEANING CART

CROSS-REFERENCE TO RELATED APPLICATIONS

This application is a continuation application of international application number PCT/EP2021/058284, filed on Mar. 30, 2021, and claims the benefit of German application number 10 2020 111 731.0, filed on Apr. 29, 2020, which are incorporated herein by reference in their entirety and for all purposes.

FIELD OF THE INVENTION

The present invention relates to a cleaning cart, comprising a frame having a frame lower part, a frame upper part and support parts which connect the frame lower part to the frame upper part and are spaced apart from one another, rollers at the frame lower part for moving on a ground surface, and storage devices for receiving therein and/or supporting thereon cleaning accessories.

BACKGROUND OF THE INVENTION

Despite modern cleaning machines, in particular in the field of interior cleaning, some of which can be automated, cleaning carts are of great importance in the field of daily cleaning. A particular emphasis is on cleaning tasks that are to be manually performed in larger buildings, such as office buildings, hotels, nursing facilities, hospitals, airports, event buildings, or the like. The cleaning carts serve to carry cleaning utensils. Examples of these include, in particular, manually guided cleaning machines and cleaning tools, receptacles for storing cleaning accessories, cleaning liquids or cleaning chemicals, receptacles for receiving dirty liquid or waste, cleaning cloths, or other items for surface cleaning.

The cleaning carts comprise rollers so that they can be moved, usually hand-guided, by a user over a ground surface. In the present case, the rollers can be stationary, i.e., unsteered. Alternatively, provision can be made for the rollers to be steered rollers. A combination of unsteered rollers and steered rollers can also be provided.

The cleaning carts comprise a frame having a frame lower part and a frame upper part spaced apart therefrom, these being connected to one another via support parts, wherein the support parts are, for example, profile parts. For example, the frame can define a receiving space for the cleaning utensils, which receiving space can be closed, for example, by way of side walls, a top wall and/or doors. However, this is not an absolute requirement. Correspondingly, a corpus or a rack in particular can also be considered as a frame in the present case.

An object underlying the present invention is to provide a cleaning cart that has increased versatility.

SUMMARY OF THE INVENTION

In an aspect of the invention, a cleaning cart is provided. The cleaning cart comprises a frame having a frame lower part, a frame upper part and support parts which connect the frame lower part to the frame upper part and are spaced apart from one another, rollers at the frame lower part for moving on a ground surface, storage devices for receiving therein and/or supporting thereon cleaning accessories, retaining elements for holding the storage devices, and receiving elements arranged at the support parts in a predefined position. The retaining elements can be selectively fixed to the receiving elements for having the storage devices assume different relative positions with respect to the support parts.

BRIEF DESCRIPTION OF THE DRAWINGS

The foregoing summary and the following description may be better understood in conjunction with the drawing figures, of which:

FIG. 17 illustrates, in top view, a frame lower part of the cleaning cart;

FIG. 18 illustrates, in bottom view, a frame upper part of the cleaning cart;

FIG. 27 illustrates an enlarged view of detail G of FIG. 26 after removal of a door wall and in a partially exploded representation;

FIG. 28 illustrates a perspective partial representation of the cleaning cart, looking in the direction of arrow "18" of FIG. 26;

DETAILED DESCRIPTION OF PREFERRED EMBODIMENTS OF THE INVENTION

Figure 1:
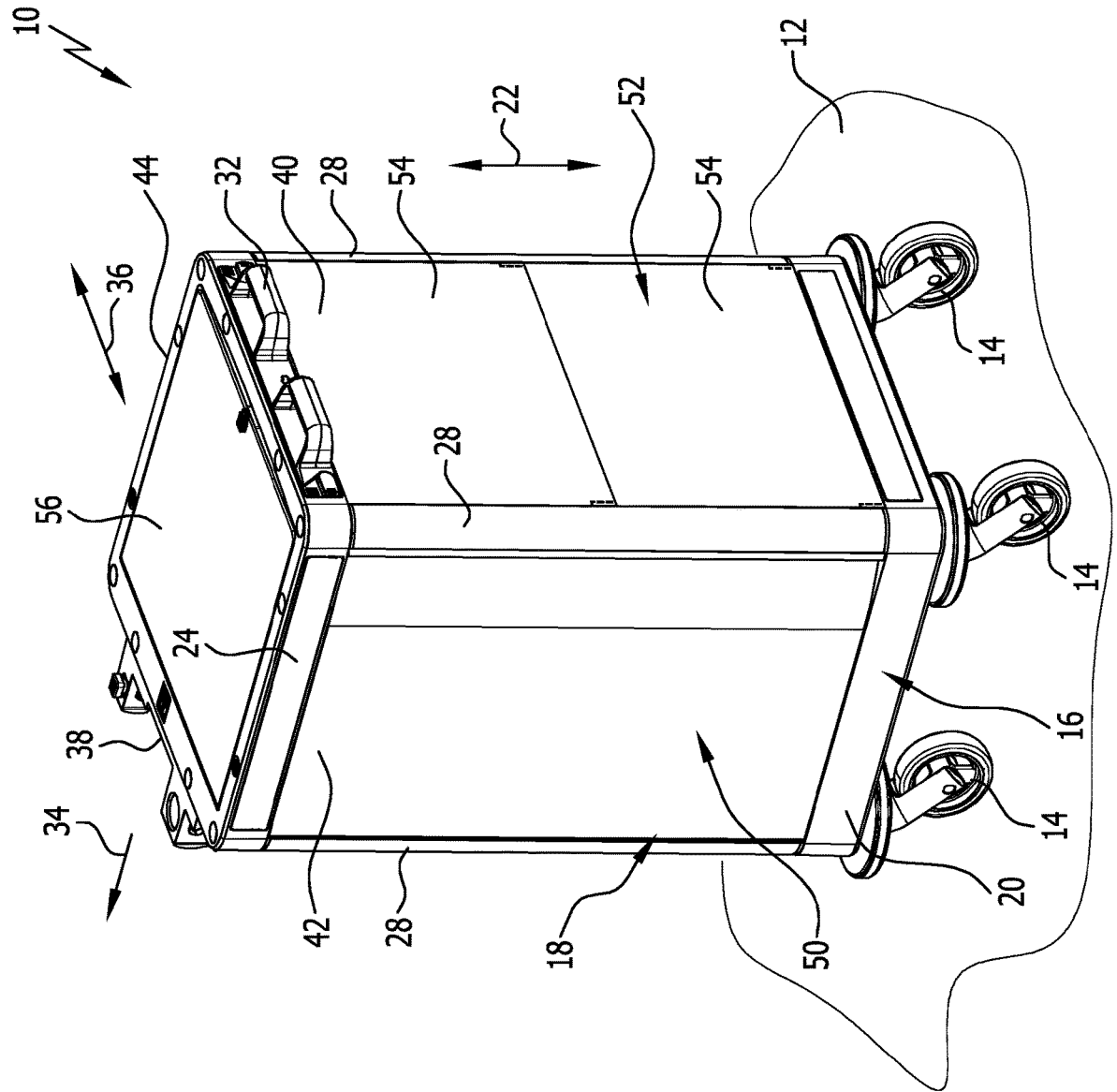
FIG. 1 illustrates a perspective view of the cleaning cart in accordance with the invention in a preferred embodiment.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a cleaning cart, comprising a frame having a frame lower part, a frame upper part and support parts which connect the frame lower part to the frame upper part and are spaced apart from one another, rollers at the frame lower part for moving on a ground surface, storage devices for receiving therein and/or supporting thereon cleaning accessories, retaining elements for holding the storage devices, and receiving elements arranged at the support parts in a predefined position, wherein the retaining elements are selectively fixable to the receiving elements for having the storage devices assume different relative positions with respect to the support parts.

In the cleaning cart in accordance with the invention, storage devices can be fixed to the support parts via the retaining elements and the receiving elements. In particular, here, the possibility exists for the storage devices to be fixed in different relative positions with respect to the support parts. In the present case, this can be realized by virtue of the fact that retaining elements can cooperate with different receiving elements in order to achieve different relative positions. This gives the possibility of providing the cleaning cart in different configurations depending, for example, on the cleaning task and/or preferences of a user, wherein the storage devices are brought into a preferred position at the frame. It is conceivable for the positioning of the storage devices to be done at the factory. However, it is advantageous in particular if the user himself or herself can arrange the storage devices in the desired positions. To this end, the retaining elements are preferably releasable from the receiving elements.

In particular, the present invention gives the possibility of a user-defined "modular-like" configuration and such an assembling by the user. For example, a quantity of identical and/or different storage devices can be provided, which can be selectively fixed to the frame as desired by the user. It is in particular conceivable to have more storage devices than are usually carried along with the cleaning cart or than can be attached thereto. In this way, for example, an ideal assembly of storage devices can be assembled, tailored to the particular cleaning task.

Preferably, the retaining elements are freely selectively fixable to the receiving elements.

It is advantageous for a plurality of receiving elements to be provided in spaced relation to one another in a height direction of the cleaning cart and for the retaining elements to be selectively fixable at different positions in the height direction. The height of the storage devices at the frame can thereby be adjusted. By way of example, the retaining elements are attached between the frame lower part and the frame upper part.

In a preferred embodiment of the invention, the receiving elements are arranged equidistantly from one another in the height direction. For example, a grid of receiving elements can be provided relative to the height direction.

As used herein, positional and orientational terms, such as "bottom", "top", "height direction", or the like, are to be understood to relate to an intended use of the cleaning cart. When in intended use, the cleaning cart is supported via its rollers on the ground surface. It can be assumed, without limitation, that the ground surface is oriented horizontally.

It is advantageous if, at the support parts, receiving elements are provided which are arranged on two sides, oriented transversely and in particular perpendicularly to one another, of the support parts, and if the retaining elements can be selectively fixed to a receiving element on a first side or to a receiving element on a second side of the two sides, with respect to different orientations of the retaining elements relative to the support part. Depending on the receiving element of what side (first or second side) the retaining element is fixed to, the latter can be oriented differently relative to the support part.

Advantageously, two orientations are provided, these being oriented transversely and in particular perpendicularly to one another. A respective orientation can, for example, define a pullout direction for an extendable storage device.

For example, the first and second sides can be adjacent to one another and extend in the height direction, preferably wherein a plurality of receiving elements are provided in spaced apart relation to one another in the height direction.

Preferably, the receiving elements arranged on the two sides arranged transversely to one another are arranged at the same position in a height direction of the cleaning cart.

Preferably, the storage devices are or comprise containers which, for example, have or form a receiving space for cleaning utensils. By way of example, the containers are bucket-shaped or basin-shaped. Extendable containers can be drawer-like or form a drawer.

For example, provision can be made for at least two containers to have different sizes, in particular wherein the containers have differing heights along a height direction of the cleaning cart, and preferably are of identical cross-section in a direction transverse to the height direction. This allows containers of differing sizes to be carried along as desired or as needed for the cleaning task.

Provision can be made for at least two containers to be of identical size, and to be of identical configuration in particular.

In a preferred embodiment, the containers can be substantially rectangular in cross-section in a direction transverse to a height direction of the cleaning cart.

It can be advantageous for the cleaning cart to comprise a marking device for marking the storage devices, and specifically the containers. Via the marking device, the user is provided with information and guidance, perceivable by intuition, as to what purposes the storage devices are to be used for. By way of example, different containers can be provided on the one hand for clean or unused cleaning utensils and on the other for dirty or used cleaning utensils.

For example, the marking device can be implemented by coloring. Here, for example, colored marking elements can be attached or are attachable to the storage devices, wherein the color is associated with the contents and/or purpose of the container.

The storage devices, in particular the containers, can for example comprise a handle element graspable by the user. Preferably, the storage device can be carried and/or displaced relative to the frame by the handle element. By way of example, the handle element is a handle strip.

It can be advantageous for the extensions of the containers in the height direction to have ratios to each other that are given by powers of two. For example, containers with a height ratio of two or with a height ratio of four can be provided.

Alternatively or in addition, provision can be made for the extensions of the containers in the height direction to be integer multiples of each other.

It is advantageous for the storage devices to comprise plate-shaped or substantially plate-shaped supporting elements having a respective supporting surface for cleaning utensils. A cleaning utensil can be placed on the supporting element. It is conceivable that, for example, a bucket-shaped receptacle be placed on a supporting element.

In a preferred embodiment, the supporting elements can be intermediate shelves or dividing shelves of a receiving space of the cleaning cart.

For example, the supporting elements can comprise, at a top side thereof, a depression enclosed by a rim to enhance the stability of cleaning utensils standing thereon.

In particular, it can be advantageous for at least one supporting element to form a cover element for a container. In this way, the supporting elements can serve a twofold function.

For example, provision can be made for cross-sections of the supporting element and of the container in a direction transverse to a height direction of the cleaning cart to be identical or substantially identical in order to completely or substantially completely cover the container.

It is advantageous for a supporting element and a container underlying same in a height direction to be holdable to at least one retaining element, preferably wherein the supporting element directly covers the container. Separate retaining elements for the container and for the supporting element associated therewith as a cover for the container are thereby obviated. For example, the retaining element comprises guide members or retaining members arranged one over another for the container and the supporting element, these being configured as a groove or strip.

In a preferred embodiment, the retaining elements are or comprise pullout guides, each of which has at least one guide member for the storage devices, in particular the containers and/or the supporting elements, wherein a respective storage device is displaceable along the guide member from a retracted position to at least one extended position and vice versa. For example, a container and/or a supporting element can be displaced from the retracted position in the receiving space of the cleaning cart to the at least one extended position in order to facilitate access to cleaning utensils for the user. In particular, the retracting and extending can also serve the mounting or dismounting of the storage devices.

Provision can be made for not all of the storage devices of the cleaning cart to be extendable as described above. For example, only some of the storage devices are extendable.

It is advantageous for the storage device, in particular the container and/or the supporting element, to be configured for assuming two extended positions and to be transferrable along the guide member starting from the retracted position in two mutually opposite directions to a respective extended position. For example, this allows access to the corresponding storage device from sides of the cleaning cart that face away from each other. To this end, the storage device can be pulled out in the respective desired direction.

The storage devices, in particular the containers and/or the supporting elements, can, for example, comprise retaining projections which engage in the guide members, preferably wherein the respective storage device can be latched with the guide member when in the retracted position and/or in the at least one extended position. Via the latching, the storage devices can assume a defined position at the frame, which facilitates the handling of the cleaning cart for the user.

For example, the guide members are groove-shaped and the retaining projections are strip-shaped.

In an embodiment of simple construction, the pullout guides can be configured as moulded plastic parts for example.

In a preferred embodiment, the pullout guides can be telescopic.

It is advantageous for the storage devices, in particular the containers and/or the supporting elements, to be extendable relative to the frame along two directions oriented transversely and in particular perpendicularly to one another, depending on the orientation of the retaining elements relative to the frame. For example, the pullout direction can be different depending on the cleaning task and preference of the user. For example, the two pullout directions are arranged in a common plane parallel to a plane of the frame lower part. By way of example, the storage devices can be pulled out, relative to a direction of travel of the cleaning cart, forwards and/or backwards (away from the user and in a direction towards the user respectively) and, where the retaining elements are differently oriented, to the left and/or to right (relative to the direction of displacement).

Advantageously, the possibility exists for the user to orient the retaining elements relative to the frame along the first of the two orientations or alternatively along the second orientation and to fix them to the support parts. This allows the user to selectively implement storage devices that can be pulled out along the first orientation or along the second orientation.

Preferably, the receiving elements are arranged on respective sides of the support parts that face towards another support part, spaced apart from the support part, in particular wherein at two support parts arranged a distance apart from each other, receiving elements are arranged at the support parts in opposing relation to one another. Preferably, here, the possibility exists in particular of positioning the retaining elements between the support parts, wherein at least one retaining element is arranged at each support part.

In a preferred embodiment of the invention, a respective retaining element can be held at end sections thereof facing away from each other to two support parts spaced apart from each other. Here, a respective end section is held to one of the support parts.

Preferably, the retaining elements in each case can be arranged in pairs, wherein a retaining element arranged at the frame in a height direction of the cleaning cart is associated with a corresponding retaining element in opposing relation thereto at the frame. For example, an extendable storage device, such as a container or a supporting element, can be held to the two retaining elements.

Preferably, the frame forms a square shape in a top plan view. By way of example, the support parts are arranged at the four corners of the imaginary square.

In accordance with the invention, the retaining elements can be fixed to the receiving elements which are arranged at the support parts. In particular, here, it is possible for the retaining elements to be fixed to the support parts directly or indirectly.

In a preferred embodiment of the invention, the support parts comprise or form the receiving elements, in particular wherein the receiving elements are formed in one piece with the support parts. For example, this gives the possibility of fixing the retaining elements directly to the support parts.

In a different preferred embodiment of the invention, it is advantageous for the cleaning cart to comprise receiving parts comprising the receiving elements, which receiving parts are formed separately from the support parts and are connected to the respective support parts. For example, this gives the possibility of fixing the retaining elements indirectly, via the receiving parts, to the support parts.

Preferably, a plurality of receiving elements are arranged at the respective receiving part. Separate receiving parts can thereby be dispensed with, which facilitates the manufacture of the cleaning cart.

Preferably, the support parts and the receiving parts can be optimally configured for their respective functions. For example, the support parts are configured as profile parts and/or are preferably made of a rugged material, for example metal.

The receiving parts can, for example, be of strip-shaped configuration and can preferably be made of a plastics material.

Preferably, the receiving parts can be fixed to the respective support part by a force-locking and/or form-locking connection.

In particular, clamping and/or latching are conceivable for the fixing.

Advantageously, the receiving parts can be fixed to the respective support part by hand and/or without tools.

In a preferred embodiment of the invention, the receiving parts can be slid into the respective support part. For example, the support part can have a groove-shaped recess or receiver into which the receiving part can be slid, wherein it is in engagement with the support part.

Preferably, the receiving part can be slid into the support part in a longitudinal direction and can, when the cleaning cart is in its intended use, extend in the height direction thereof, for example. It is conceivable that a plurality of receiving parts be fixable to the support part and in particular slidable thereinto.

It is advantageous for at least one retaining element to comprise two contact regions oriented transversely to each other and in particular perpendicularly adjacent to one another, via which contact regions the retaining element is in contact, preferably area contact, against corresponding contact regions of the support part or against corresponding contact regions of a receiving part comprising the receiving elements. In this way, a reliable relative orientation of the retaining element and the receiving elements can be ensured. For example, the support part or the receiving part and the retaining element are contacted against one another around corners, wherein the two sides are adjacent to one another.

Preferably, the contact regions are planar in order to enable flange-like contact of the retaining element.

Preferably, the retaining elements can be fixed to the receiving elements by a force-locking and/or form-locking connection.

For example, provision can be made for the retaining elements to be clamped and/or latched with the receiving elements.

It is advantageous for the retaining elements to be releasably fixable to the receiving elements so that the position of the retaining elements can be varied and/or unneeded retaining elements can be removed.

The retaining elements can preferably be fixed to and/or released from the receiving elements by hand and/or without tools.

In a preferred embodiment of the invention, provision can be made for the retaining elements and the receiving elements to comprise retaining projections and corresponding engagement openings for the retaining projections which are in engagement with one another when in a connecting position.

For example, the retaining projections are arranged at the retaining elements, and the receiving elements comprise or form the engagement openings.

Preferably, biasing elements are provided against whose action the retaining projections can be brought out of engagement with the engagement openings.

For example, a biasing element is associated with a respective retaining projection in order to bias the retaining projection in a direction towards the connecting position. This ensures reliable engagement of the retaining projections in the engagement openings. Preferably, the retaining projection can be released from the engagement opening against the action of the biasing element.

It is advantageous for the retaining elements and the receiving elements to comprise orienting projections and corresponding grooves for the orienting projections, these being in engagement with each other in the connected state of the retaining elements with the receiving elements. This enables reliable relative orientation of the retaining elements to the receiving elements.

For example, the orienting projections are arranged at the retaining elements and the grooves are arranged at the support parts or at the receiving parts.

Preferably, the orienting projections or grooves are formed separately from the retaining projections and the engagement openings.

For example, receivers for the support parts can be formed at the frame lower part and/or at the frame upper part in order to facilitate assembly of the cleaning cart.

As has already been mentioned, the cleaning cart can comprise a corpus which is formed by the frame. For example, here, side walls and/or doors are provided. Preferably, the corpus encloses a receiving space in which the storage devices can be arranged.

Correspondingly, the cleaning cart can comprise at least one door which can be transferred from a closed position to an open position and vice versa. For example, a storage space of the corpus can be accessed by opening the door.

Preferably, the door comprises a door wall and fixing parts between which the door wall is held or arranged, wherein the fixing parts are pivotably held, directly or indirectly, to the frame via bearing elements. Advantageously, the bearing elements of the fixing parts define a pivot axis for the door. Preferably, the pivot axis extends in a height direction of the cleaning cart.

A tension element can be provided for tensioning the fixing parts in place relative to one another.

For example, in a preferred embodiment of the invention, a corresponding bearing element for a bearing element at the fixing part can be arranged or formed at the frame lower part and/or at the frame upper part.

Provision can be made for a bearing element corresponding to a bearing element of a fixing part to be arranged or formed at at least one retaining element.

The fastening mechanism for the door can be of identical or functionally equivalent configuration to the fastening mechanism for the retaining elements. For example, retaining projections are arranged at the door and corresponding engagement openings are arranged at the frame, these engaging with one another when in a connecting position. In this respect, reference may be had to what has been described in the foregoing, also with respect to the biasing elements.

Preferably, the door can be attached to the cleaning cart in two different orientations and positions in which the door, rotating about parallel pivot axes in directions pointing away from each other relative to the frame, can be transferred to the open position. This lends high versatility to the cleaning cart. Here, provision can be made for a user to be allowed to alter the desired position of the door (the "handing" of the door) on the cleaning cart.

For example, provision can be made for the user, when facing the door, to swing the door open to the left ("left-hand opening door") or to the right ("right-hand opening door").

To this end, for example, different bearing elements are provided at the frame lower part and/or at the frame upper part. Alternatively or in addition, at least one different retaining element having a respective bearing element is provided for this purpose in order to change the location of the door hinge.

Preferably, the position of the door at the frame can be changed by hand and/or without tools.

Preferably, arranged at the frame upper part is a top wall which can be transferred from a closed position to an open position and/or which can be removed from the frame upper part. This can create a reach-through opening through which access can be gained to the receiving space from the top. Alternatively or in addition, for example, a cleaning utensil can project upwardly from the receiving space and through the reach-through opening.

Preferably, the cleaning cart is hand-guided and comprises a handle device graspable by a user.

FIG. 1 shows an advantageous embodiment of the cleaning cart in accordance with the invention, designated by the reference numeral 10. The cleaning cart 10 serves to carry cleaning utensils, in particular for manual cleaning, such as hand-guided cleaning machines or cleaning tools, containers for further cleaning utensils or cleaning accessories, cleaning liquids or cleaning chemicals, cleaning utensils such as wiping cloths, containers for holding waste, etc.

The cleaning cart 10 can be moved on a ground surface 12 by a user in a hand-guided manner. Positional and orientational terms as used herein are assumed to relate to an intended use of the cleaning cart 10. Here, the cleaning cart 10 is supported via rollers 14 on the ground surface 12 which, by way of example and not by way of limitation, can be considered to be horizontal.

The cleaning cart 10 comprises a frame 16 which in the present case forms a corpus 18. The frame 16 comprises a substantially plate-shaped frame lower part 20 and a frame upper part 24 spaced relative thereto in a height direction 22. The frame upper part 24 itself is frame-shaped and forms a reach-through opening 26.

The frame lower part 20 and the frame upper part 24 are connected to one another via support parts 28, these being fixed at respective corner regions of the frame lower part 20 and the frame upper part 24. To this end, receivers 30 can be provided at the lower frame part 20 and the upper frame part 24 (FIGS. 17 and 18), into which receivers 30 the support parts 28 can be inserted. The support parts 28 are formed as profile parts.

In the present case, four support parts 28 are provided, each spaced apart one from the other.

The frame 16 forms a square shape in a top plan view. Here, the support parts 28 are arranged at the corners of the imaginary square.

The rollers 14 are held to the lower frame part 20 and are, in the present case, configured as steerable rollers. Also conceivable is the use of unsteered rollers.

Provided at the frame upper part 24 is a handle device 32 for the user to move the cleaning cart 10. Usually, this can be realized in a forward movement along a travel direction 34. The cleaning cart 10 has a front side 38 in the travel direction 34. The handle device 32 is arranged on the rear side 40.

A transverse direction 36 is oriented transversely to the travel direction 34, in particular wherein the travel direction 34, the transverse direction 36 and the height direction 22 are pairwise perpendicular to one another.

The cleaning cart 10 further comprises a left side 42 and a right side 44.

The frame 16 defines a receiving space 46 in which storage devices 48 for cleaning utensils are arranged. The receiving space 46 is closed by the corpus 18. To this end, the cleaning cart 10 comprises two doors 50, of which only one door 50, on the left side 42, is illustrated in the drawing.

Furthermore, the cleaning cart comprises two side walls 52 (FIGS. 1, 19, 22 and 23). The side walls 52 each have segments 54 arranged one above the other.

On the top side, the cleaning cart 10 comprises a top wall 56 by which the reach-through opening 26 can be closed off. In particular, the top wall 56 can be releasably fixable to the frame upper part 24. It is in particular desirable for the top wall 56 to be for example pivotable on the frame upper part 24 from a closed position to an open position and vice versa.

The storage devices 48 are configured and adapted for receiving therein and/or supporting thereon cleaning accessories. The storage devices 48 in the present case comprise containers 58 and supporting elements 60.

The containers 58 themselves constitute cleaning accessories and are of a bucket-shaped or basin-shaped configuration. They have a receiving space for cleaning accessories. In the present case, the containers 58 have a substantially rectangular cross-section in the height direction 22.

In particular, the cleaning cart 10 can comprise a plurality of containers 58. Of these, at least two containers 58 can be of identical configuration and/or at least two containers 58 can have different configurations.

Provision can be made for the cleaning cart 10 to comprise more containers 58 than could be attached thereto and carried thereby. Depending on what particular containers 58 and, correspondingly, what particular supporting elements 60 are assembled, the cleaning cart 10 can be customized to cleaning tasks and/or preferences of the user.

Preferably, different containers 58 only differ in their extensions along the height direction 22 and are otherwise of substantially identical configuration. In particular, for example, they can be substantially identical in their cross-section transverse to the height direction 22. Differently from this, containers 58 formed to taller heights can, for example, have a greater taper because of their greater height.

Figure 2:
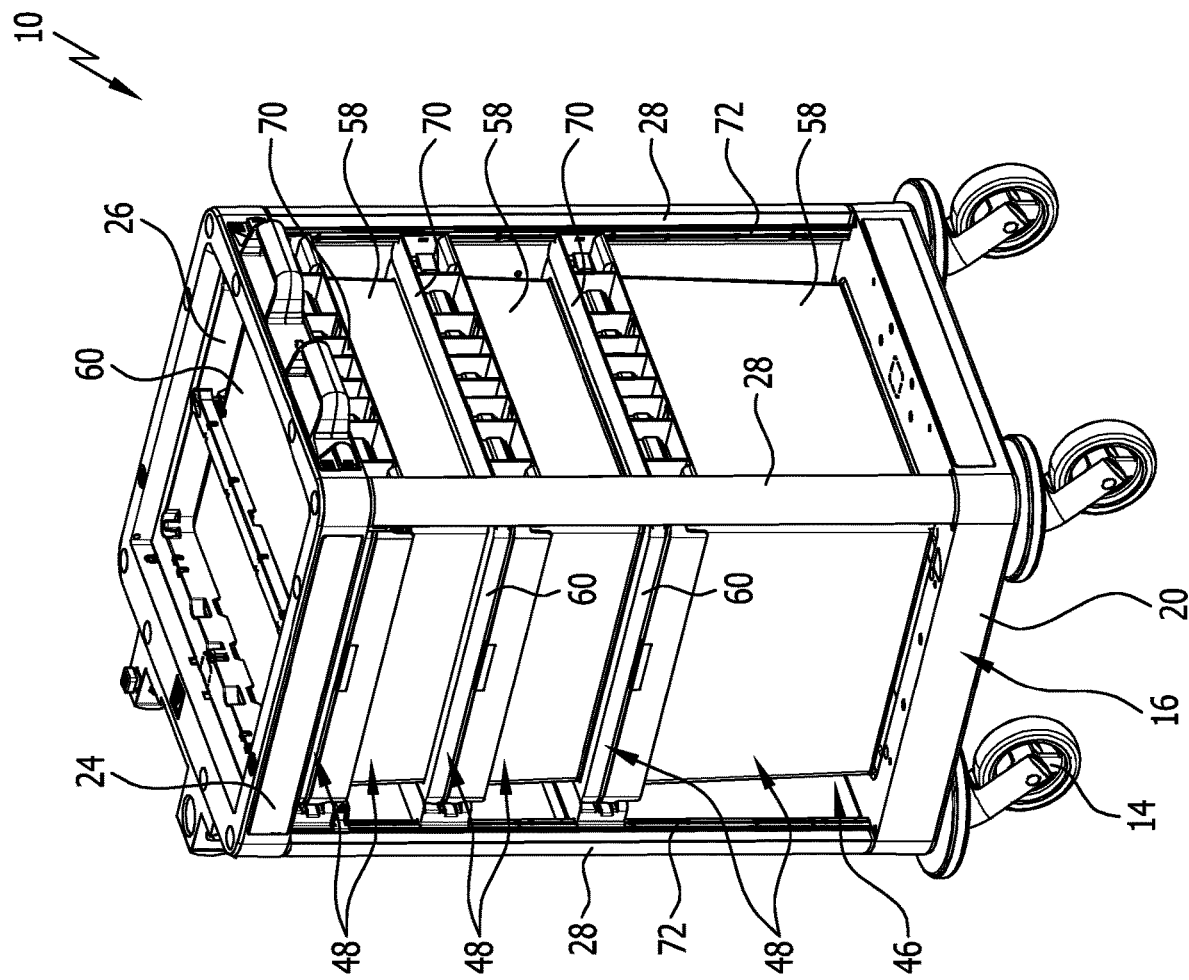
FIG. 2 illustrates the cleaning cart of FIG. 1 after doors, side walls and a top wall have been removed.
Figure 14:
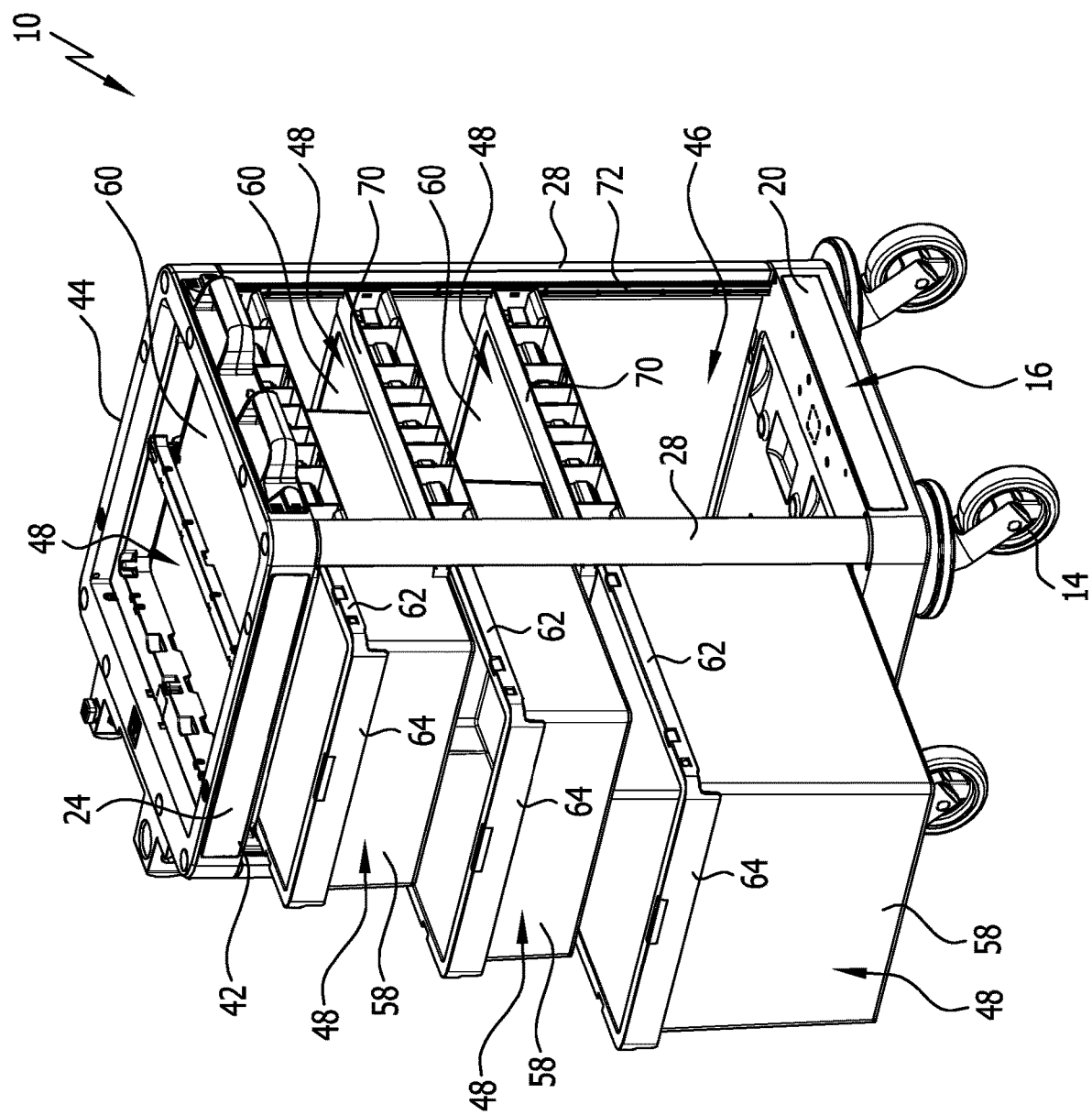
FIG. 14 illustrates a representation corresponding to FIG. 2, wherein the containers assume extended positions with respect to a frame of the cleaning cart.

As shown in the examples of FIGS. 2 and 14, the cleaning cart 10 can comprise two different types of containers 58, namely a tall container 58 and two less tall containers 58.

Figure 16:
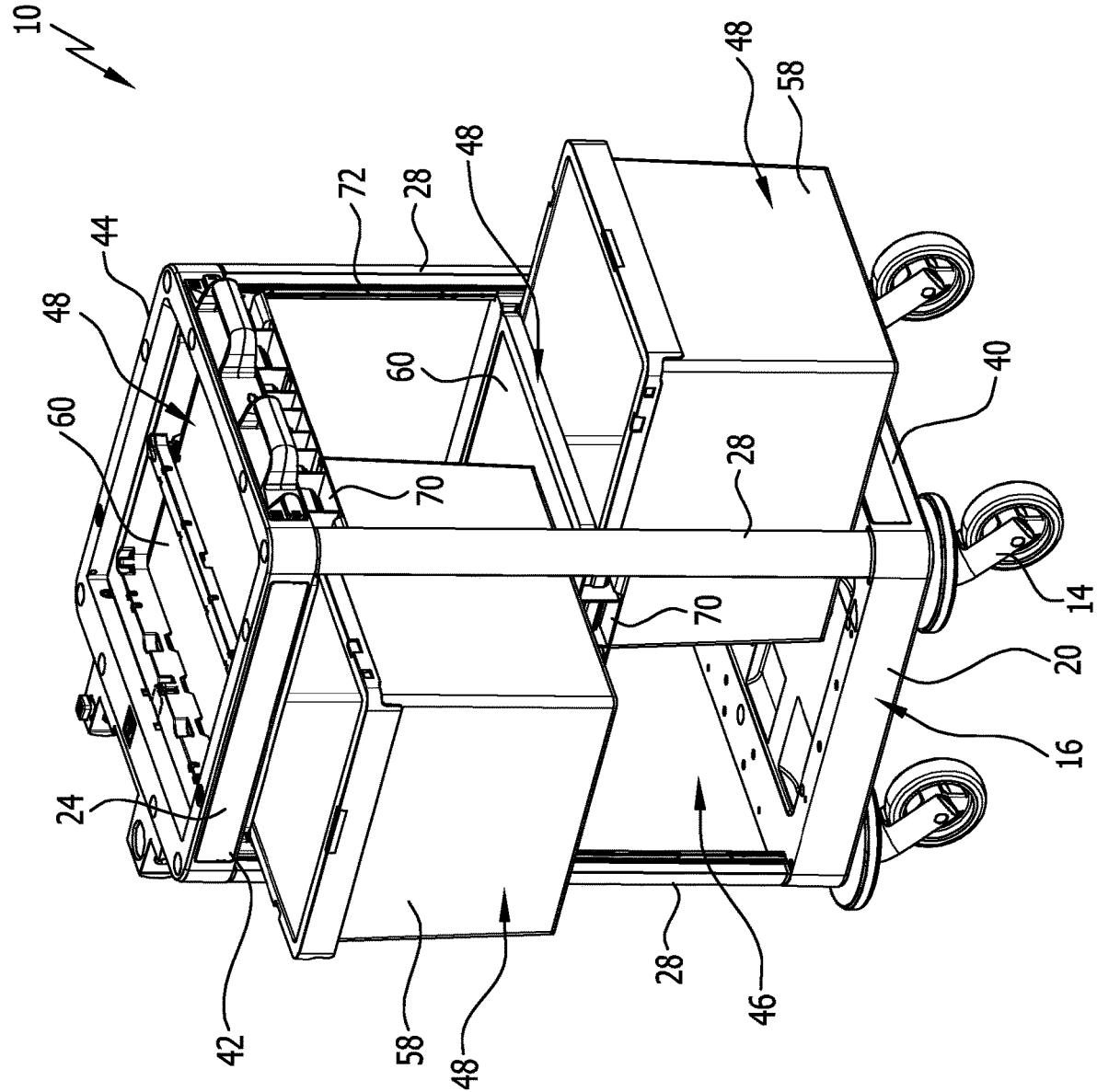
FIG. 16 illustrates a representation similar to FIG. 15, wherein two containers have been replaced by a different container and retaining elements have been removed.
Figure 19:
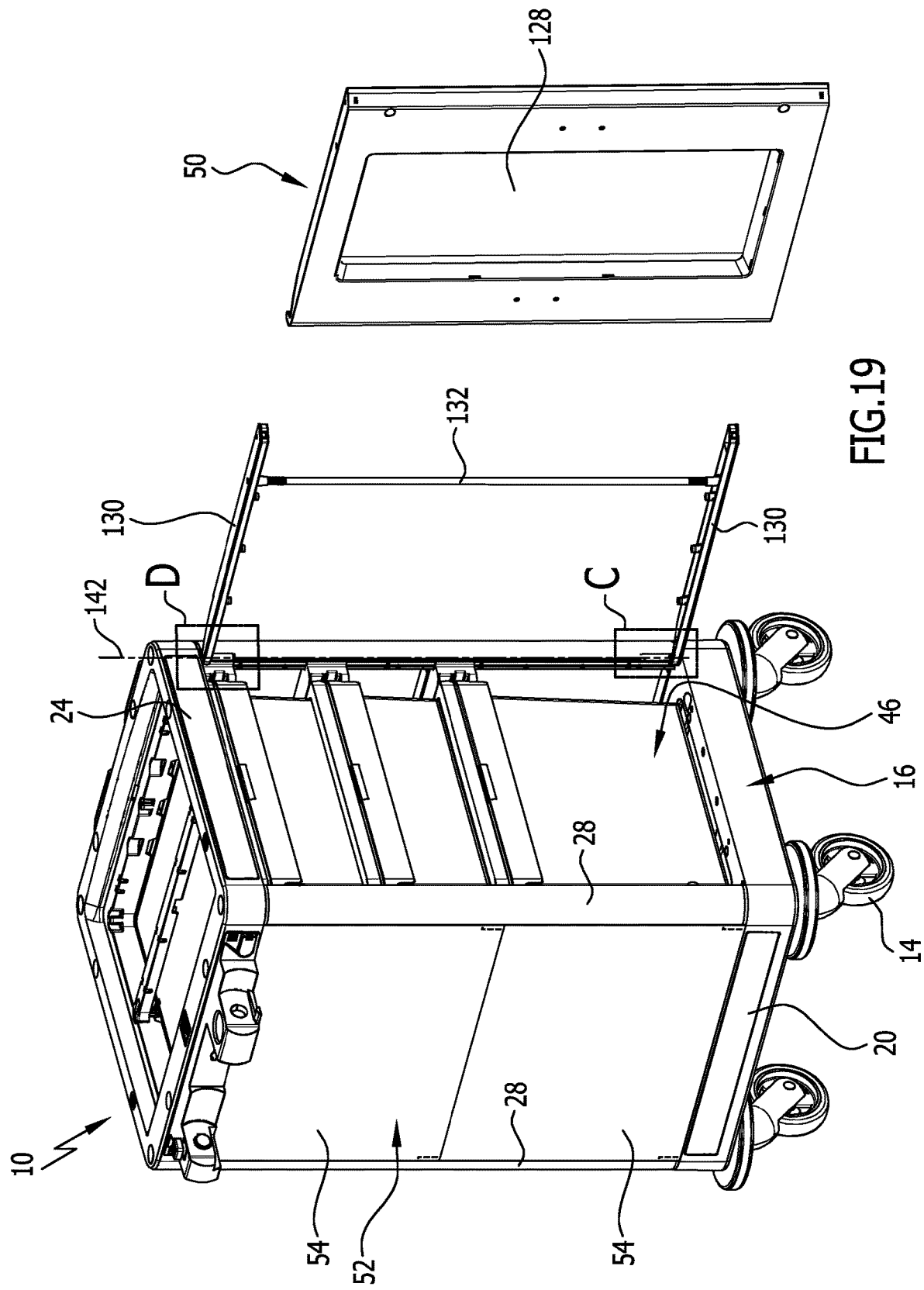
FIG. 19 illustrates another perspective representation of the cleaning cart of FIG. 1 with a door open, shown in a partially exploded representation.
Figure 21:
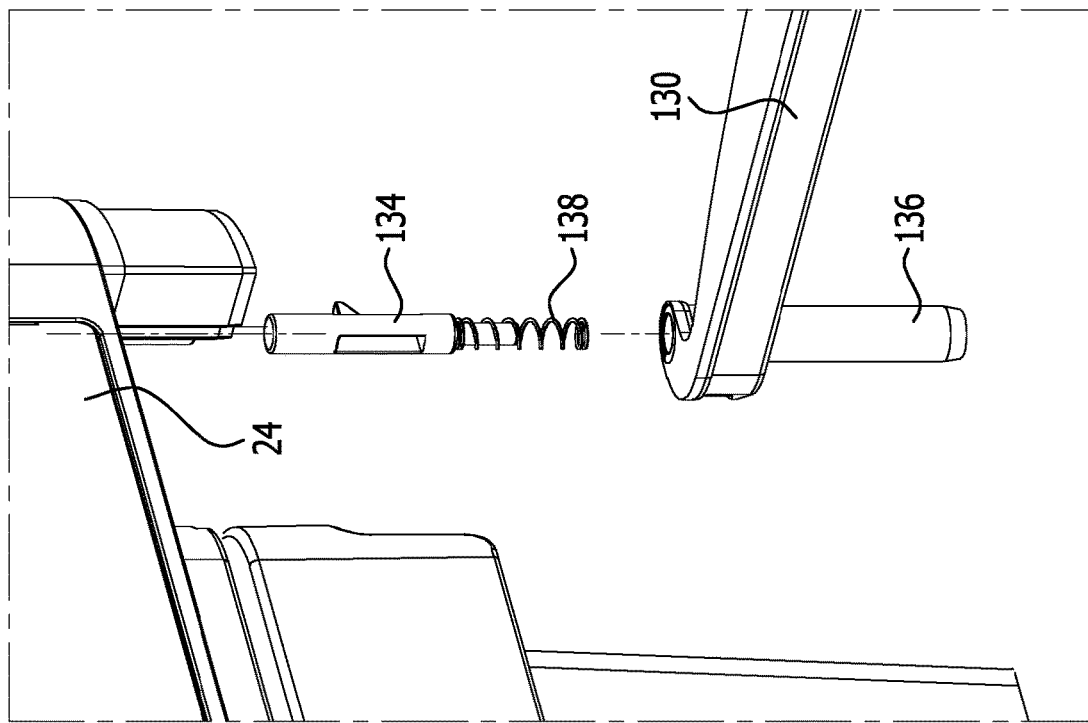
FIG. 21 illustrates an enlarged representation of detail D of FIG. 19 in a simplified, exploded view.
Figure 20:
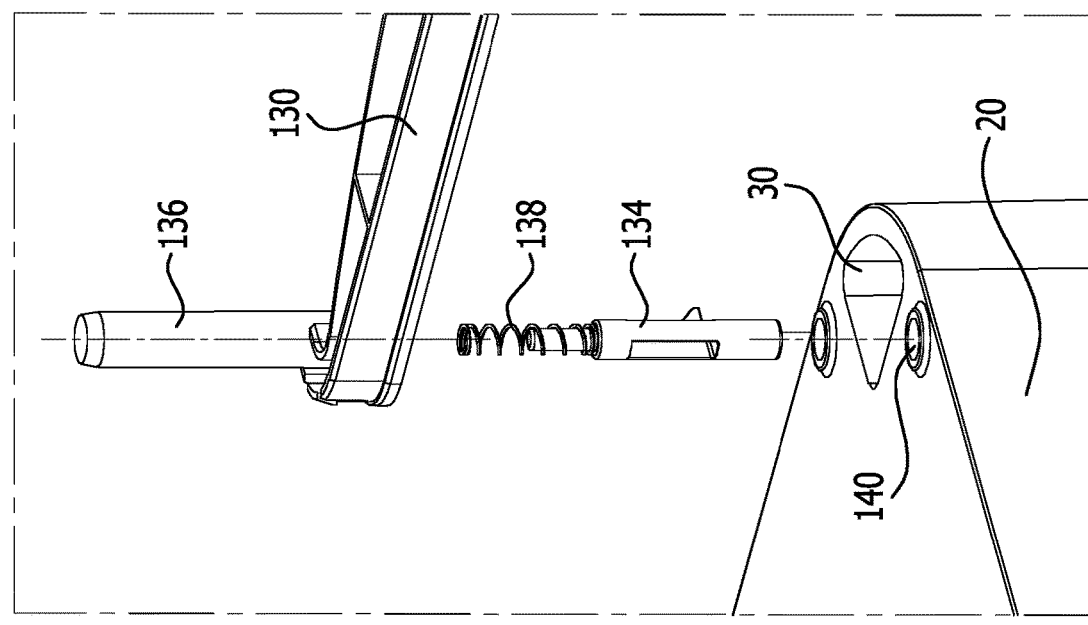
FIG. 20 illustrates an enlarged representation of detail C of FIG. 19 in a simplified, exploded view.

Provision can be made for the cleaning cart 10 to comprise further containers 58. The example of FIG. 16 illustrates a further tall container 58.

It is advantageous for the containers 58, and in a corresponding manner the supporting elements 60, to be combined with each other in a modular-like manner, depending on the cleaning task and/or preference of the user.

This is made possible by the ways and manners in which the storage devices 48 are held to the frame 16.

The containers 58 each include retaining projections 62 on opposite sides thereof. The retaining projections 62 are of strip-shaped configuration.

Furthermore, in the present case, the containers 58 comprise handle elements 64, likewise on opposite sides thereof, albeit where the retaining projections 62 are not arranged. The handle elements 64 are also strip-shaped.

The cleaning cart 10 can comprise a marking device for marking the containers 58. By way of example, the marking device comprises marking elements that can be attached or can be attachable to the containers 58. For example, the marking element is arranged at the handle element 64. The marking device can be implemented, for example, by coloring.

Figure 3:
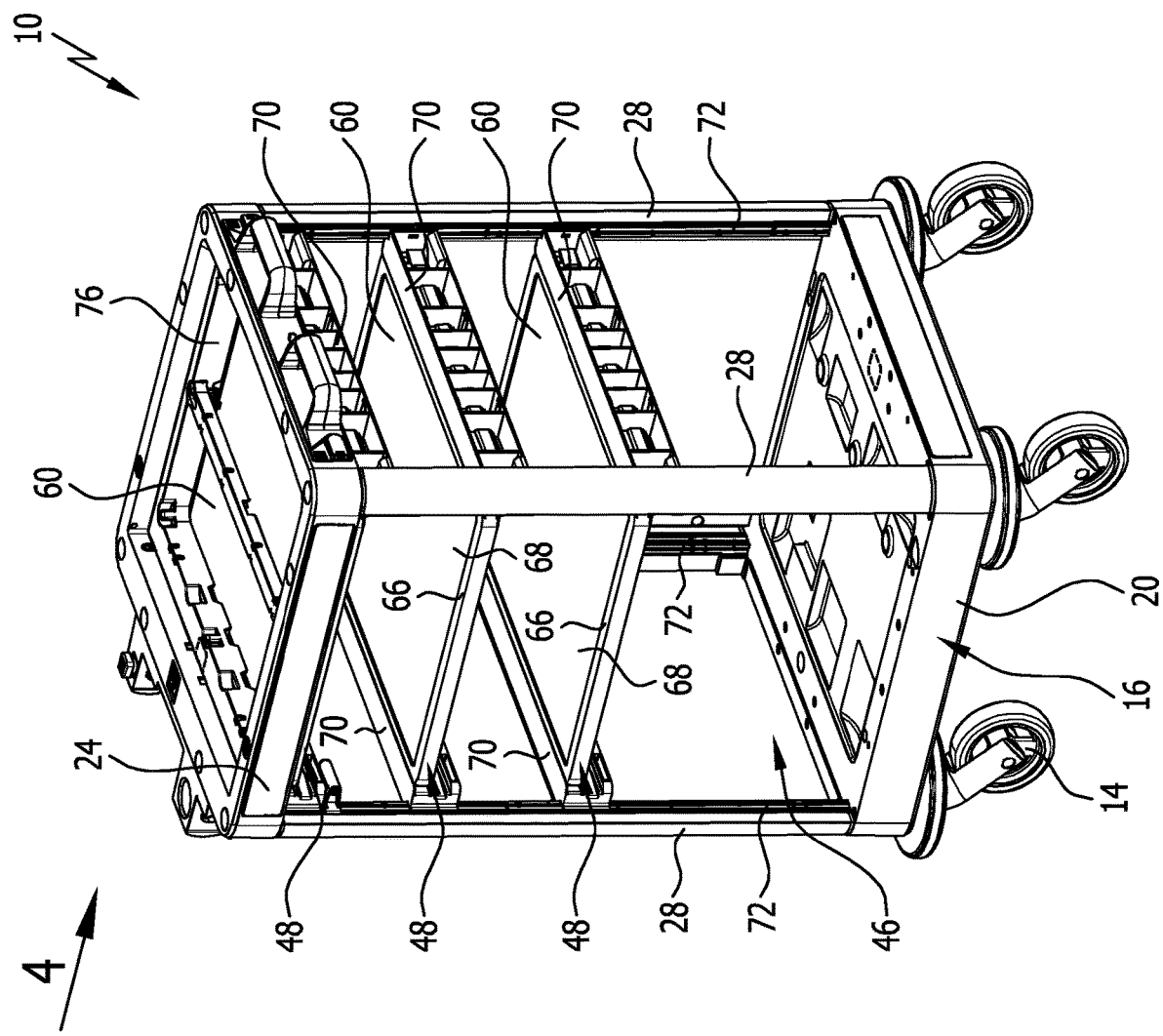
FIG. 3 illustrates the cleaning cart of FIG. 2 after containers have been removed.
Figure 4:
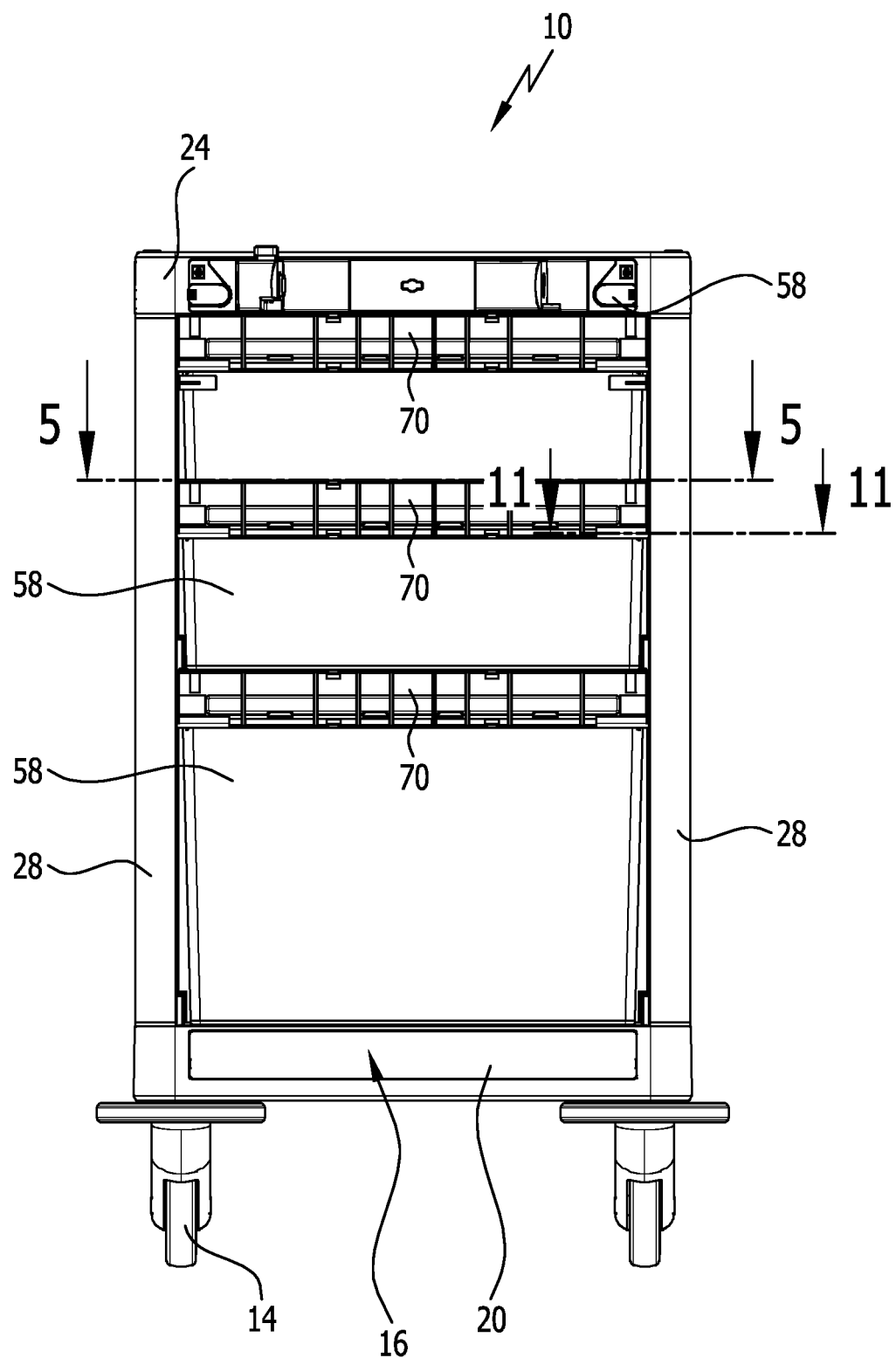
FIG. 4 illustrates a side view of the cleaning cart, looking in the direction of arrow "4" of FIG. 3.

The supporting elements 60 are plate-shaped, as can be seen from FIG. 3 for example. Preferably, here, on a top side of a respective supporting element 60, a depression 68 is provided which is enclosed by a rim 66 and has a supporting surface for cleaning utensils.

The support parts 28 are of longitudinally extending configuration and are formed from a metal material for example. On their outer side, the support parts 28 have an arcuate section 76 which substantially extends over a quarter circle. Projecting from the section 76 are two lateral sections 78, on a respective side of the support part 28.

Figure 6:
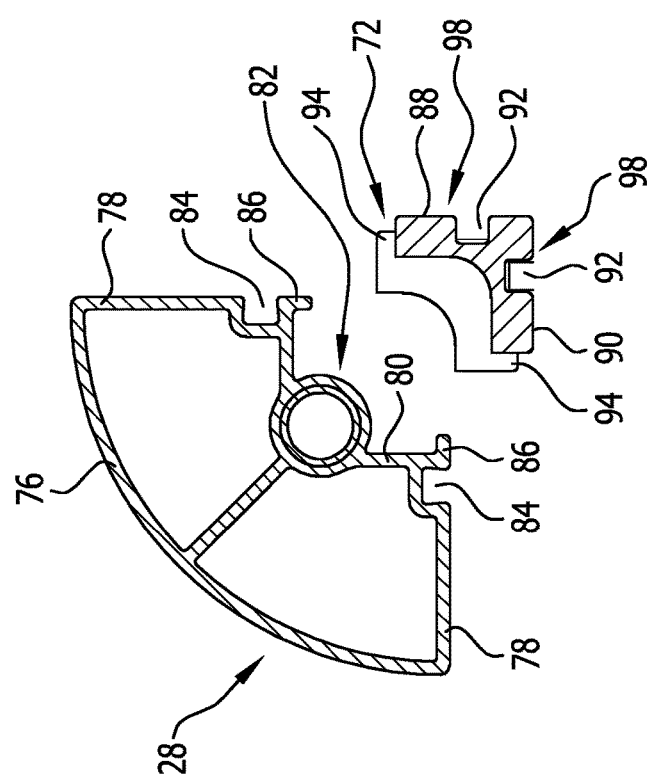
FIG. 6 illustrates a perspective partial view of detail A of FIG. 5, showing a support part and a receiving part of the cleaning cart in exploded representation.

On a side facing away from the section 76, the sections 78 transition into a connecting section 80 which connects the sections 78. Laterally next to the connecting section 80 is a groove-shaped receiver 82 formed along the extension of the support part 28. Further, the sections 78 each have, in the direction of extension of the support part 28, a groove 84 and a projection 86 at the edge of the groove-shaped receiver 82 (FIG. 6).

To fix the storage devices 48 to the frame 16 and to the support parts 28 in particular, the cleaning cart 10 comprises retaining elements 70 and receiving parts 72 which latter form receiving elements 74 and cooperate with the retaining elements 70. In the following, the receiving parts 72 are first discussed with particular reference to FIGS. 5 to 8 and 11 to 13.

The receiving part 72 is strip-shaped and extends parallel to the support part 28, and, like the latter, it extends in the height direction 22 in particular.

In a direction transverse to the height direction 22, the receiving part 72 has an approximately L-shaped cross-section with a first side 88 and a second side 90. Located on each side 88, 90 is a groove 92 running in a longitudinal direction in each case.

The receiving part 72 comprises on each side 88, 90 thereof a projection 94. The projection 94 engages behind the respective projection 86.

The receiving part 72 is, for example, made of a plastics material and can be connected to the support part 28 by hand and without tools. Here, for example, the receiving part 72 can be longitudinally slid into in the support part 28 and fixed thereto.

In the present case, the receiving parts 72 are dimensioned such that two receiving parts 72 arranged one above the other are held to each support part 28.

Figure 7:
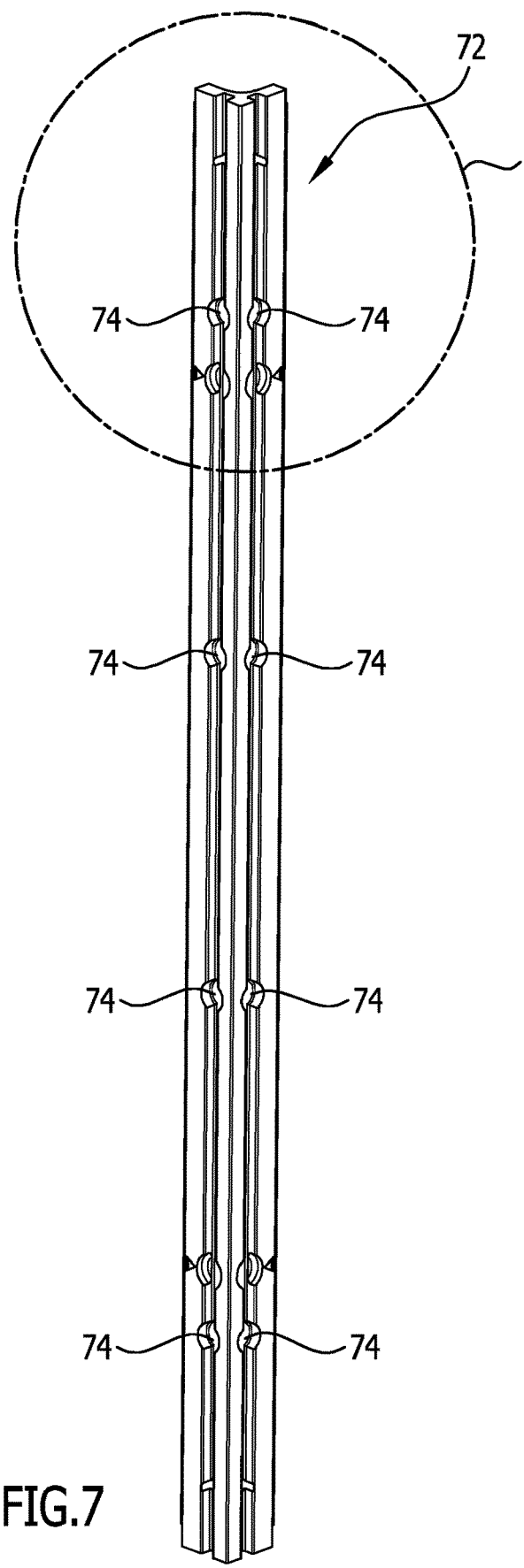
FIG. 7 illustrates a perspective representation of the receiving part.
Figure 8:
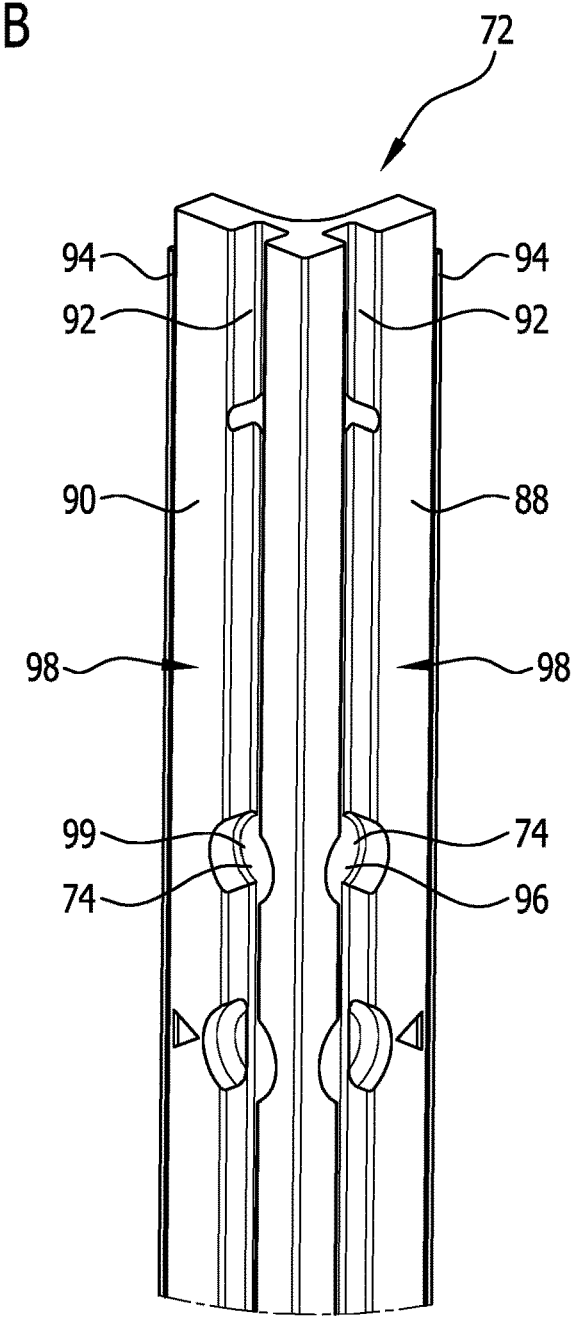
FIG. 8 illustrates an enlarged representation of detail B of FIG. 7.
Figure 9:
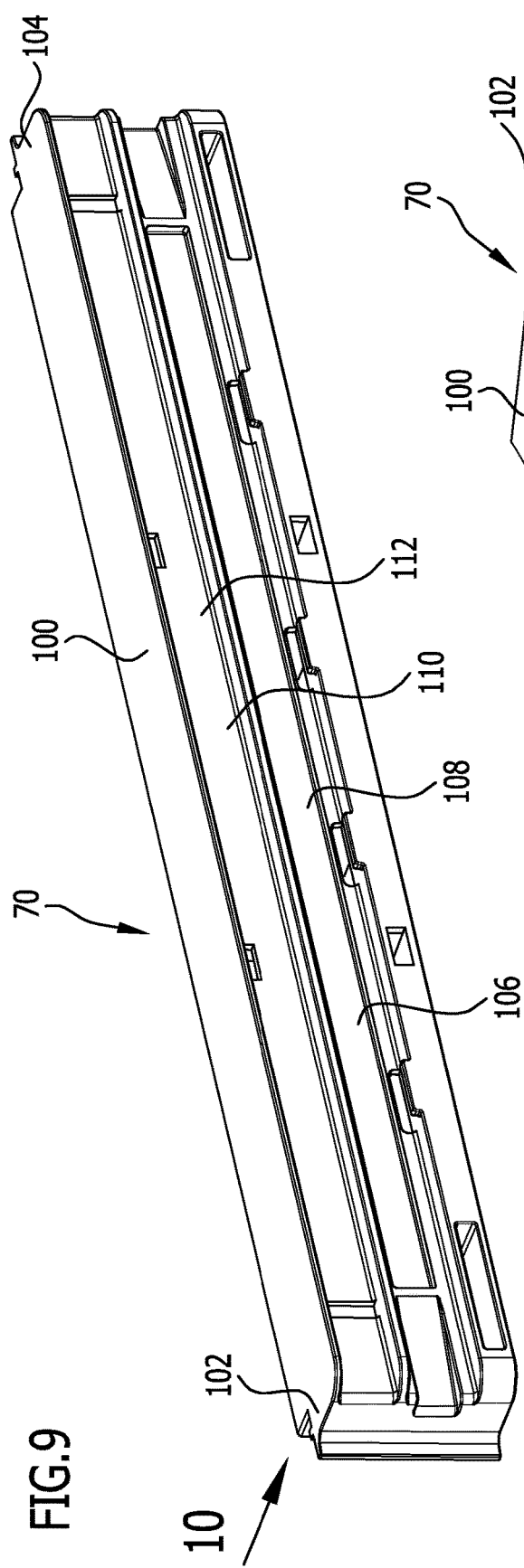
FIG. 9 illustrates a perspective representation of a retaining element of the cleaning cart of FIG. 1.

The receiving elements 74 are formed on the receiving part 72 and are each configured in the form of engagement openings 96 (FIGS. 7 and 8). In the present case, a plurality of receiving elements 74 are arranged along the receiving part 72 in each case. These are in particular positioned equidistantly from each other.

Furthermore, the receiving elements 74 are arranged such that in the two receiving parts 72 arranged one above the other, the respective adjacent receiving elements 74 are the same distance from one another as in each of the receiving parts 72. This results in a grid of receiving elements 74 in the height direction 22.

In each case, receiving elements 74 are arranged on either side 88 and 90. In particular, the receiving elements 74 are in each case formed at the same location in the receiving part 72, in the height direction 22.

Figure 5:
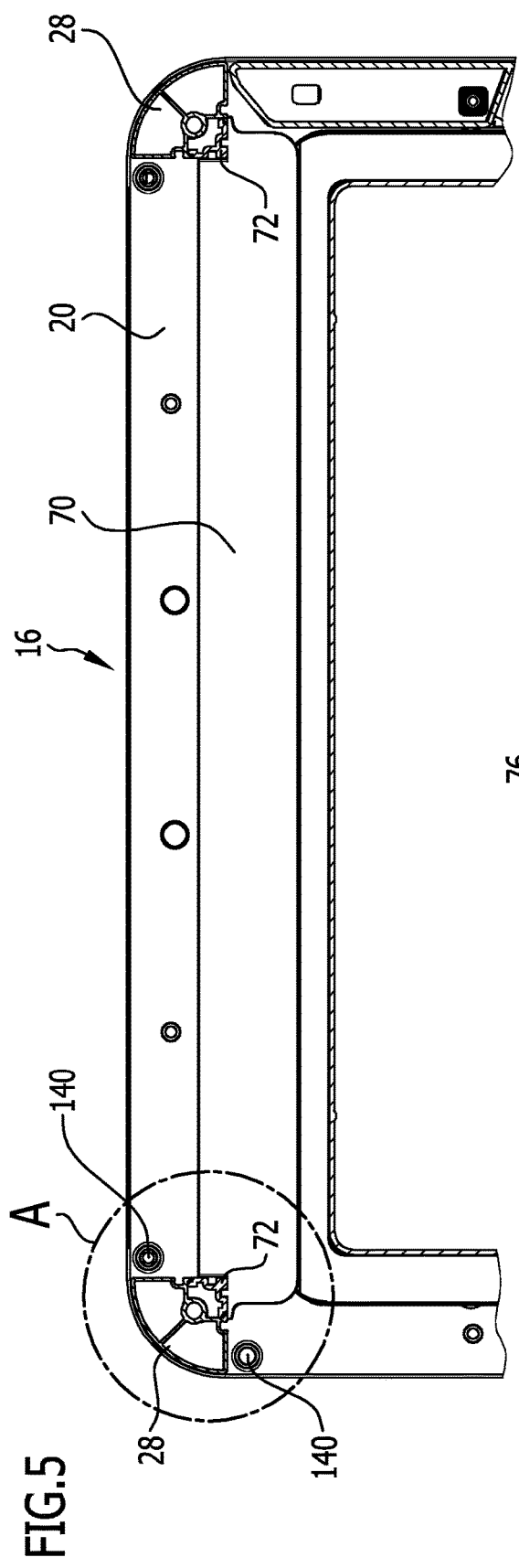
FIG. 5 illustrates a sectional view along line 5-5 of FIG. 4.

As can be seen from FIGS. 3 and 5 for example, the receiving parts 72 are arranged at the spaced-apart support parts 28 such that in each case a side 88 of one receiving part 72 faces towards a side 90 of another receiving part 72.

The receiving elements 74 comprised by these are in spaced apart and opposing relation to one another.

Furthermore, the receiving elements 74 are arranged on the sides of the support parts 28 that are formed by the lateral sections 78. These two sides of the support parts are oriented transversely and in particular perpendicularly to one another.

The sides 88, 90 of the receiving parts 72 are oriented transversely and in particular perpendicularly to one another and are adjacent to one another.

A respective side 88, 90 has a contact region 98 outside the groove 92, along the extension of the receiving parts 72.

The retaining elements 70 in the present case are formed as pullout guides 100. Here, the retaining elements 70 are of strip-shaped configuration having a first end section 102 and a second end section 104. The retaining element, at a respective end section 102, 104 thereof, can be releasably fixed to two spaced-apart support parts 28, wherein the fixing is realized indirectly via the receiving parts 72 having the receiving elements 74.

The retaining element 70 comprises a guide member 106 for a side of a container 58, in particular for the retaining projection 62 thereof. The guide member 106 is a groove 108 in which the retaining projection 62 engages and is retained therein. The guide member 106 extends substantially the entire length of the retaining element 70. Preferably, the container 58 can be latched with the groove 108 in at least one position.

Furthermore, the retaining element 70 comprises a guide member 110 for receiving the rim 66 of the supporting element 60. In the present case, the guide member 110 is also configured as a groove 112 which extends substantially along the entire length of the retaining element 70. Preferably, the supporting element 60 can be latched with the groove 112 in at least one position.

In particular, the grooves 108, 112 extend parallel to one another, wherein the groove 112 for the supporting element 60 is arranged above the groove 108 for the container 58.

In intended use of the retaining elements 70, the grooves 108, 112 are oriented in a plane in particular transverse and specifically perpendicular to the height direction 22, in particular horizontally.

In the present case, the pullout guides 100 are simple to produce from a manufacturing standpoint in the form of moulded plastic parts which do not comprise any moving parts for guiding the storage devices 48. In a different embodiment not depicted in the drawing, the pullout guides 100 can be telescopic, for example.

The retaining element 70 has at each of its end sections 102, 104 a retaining projection 114. The retaining projection 114 in a connecting position can engage in the engagement opening 96 of the receiving element 74. This gives the possibility of fixing the retaining element 70 to the respective receiving element 74 and hence indirectly to the support part 28.

Figure 11:
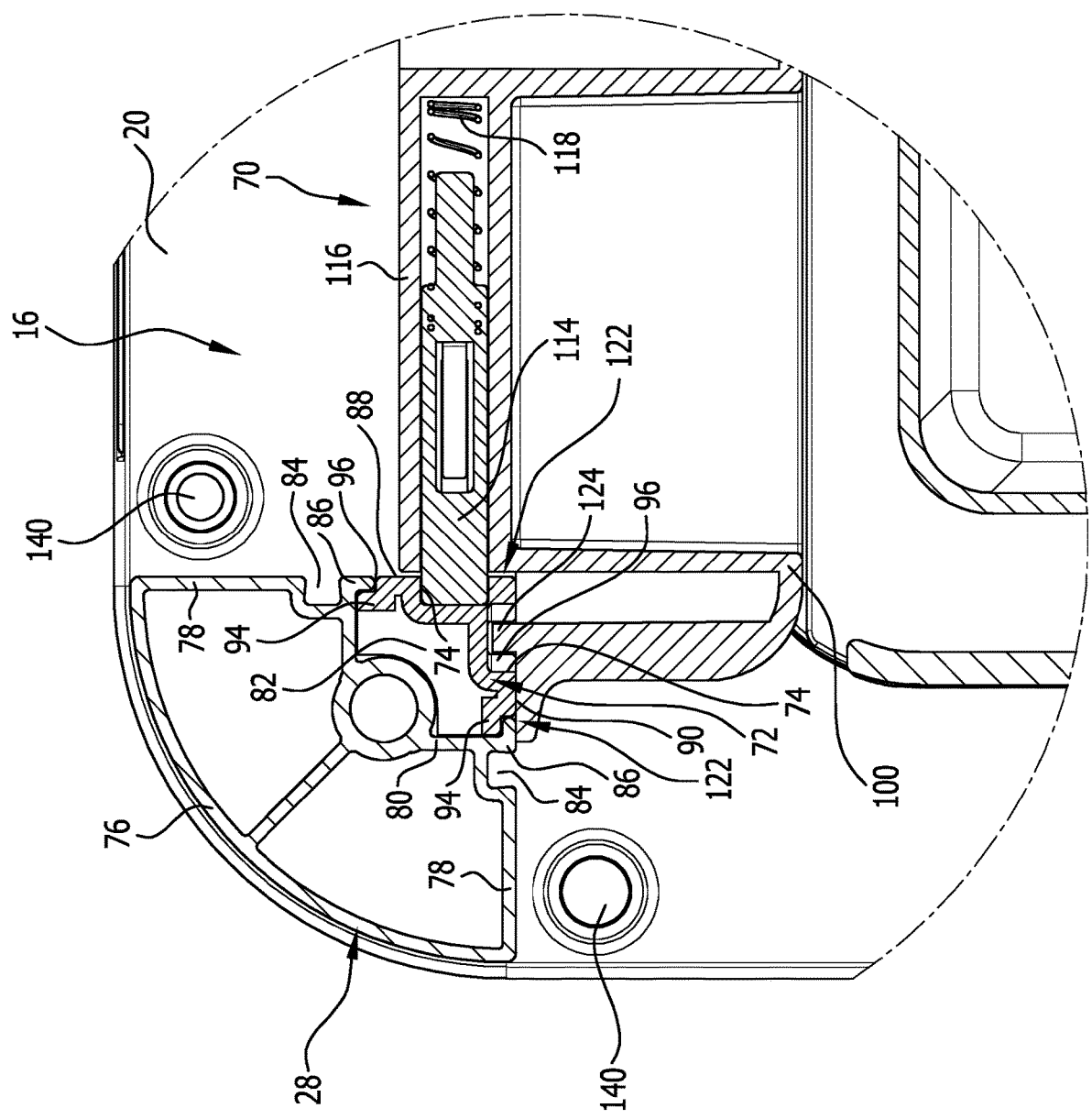
FIG. 11 illustrates a sectional view along line 11-11 of FIG. 4.

As can be seen from FIG. 11 in particular, the retaining projection 114 is displaceably arranged at the retaining element 70. The retaining element 70 forms a sleeve 116 for receiving the retaining projection 114. Arranged in the sleeve 116 is a biasing element 118, in the present case configured as a helical spring. The biasing element 118 applies to the retaining projection 114 a force acting in direction of the connecting position and thereby secures the latter's engagement with the receiving element 74.

Figure 10:
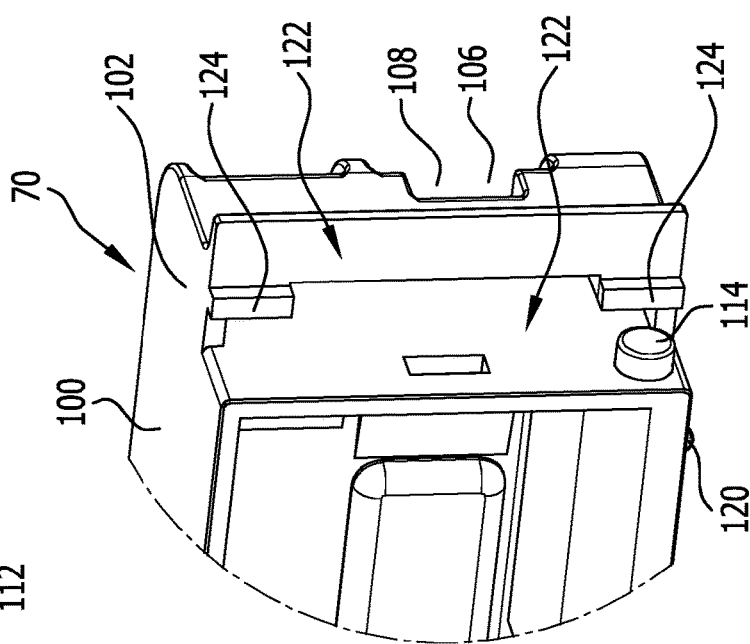
FIG. 10 illustrates an enlarged detail representation, looking in the direction of arrow "10" of FIG. 9.

The retaining projection 114 can be moved against the action of the biasing element 118 into a release position in which the engagement with the receiving element 74 is removed. The retaining element 70 can thereby be released from the receiving element 72. An actuating member 120 is provided for displacing the retaining projection 114 (FIG. 10).

Figure 13:
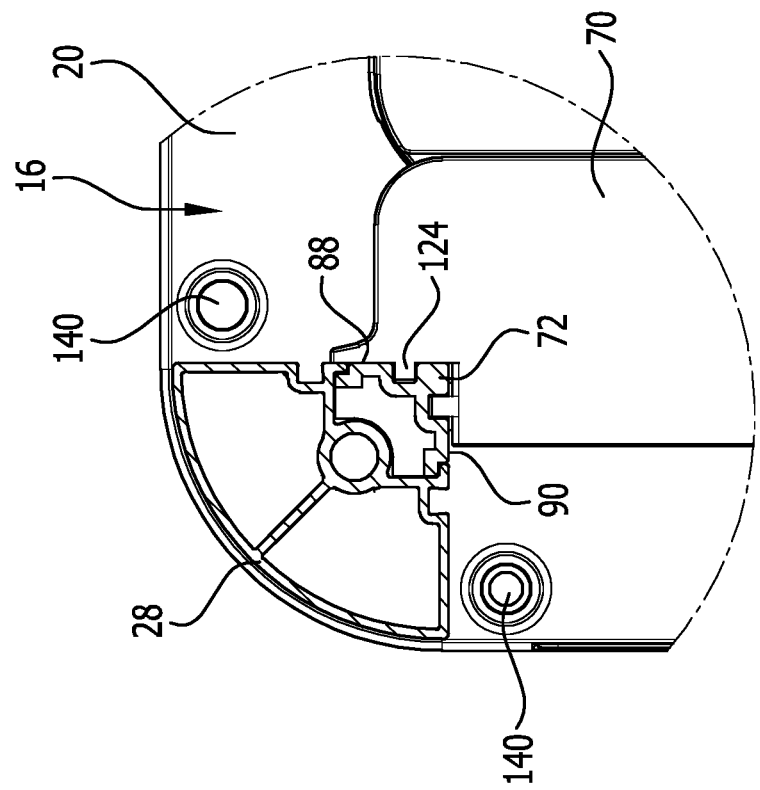
FIG. 13 illustrates a representation corresponding to FIG. 12, wherein a retaining element assumes a different orientation.
Figure 12:
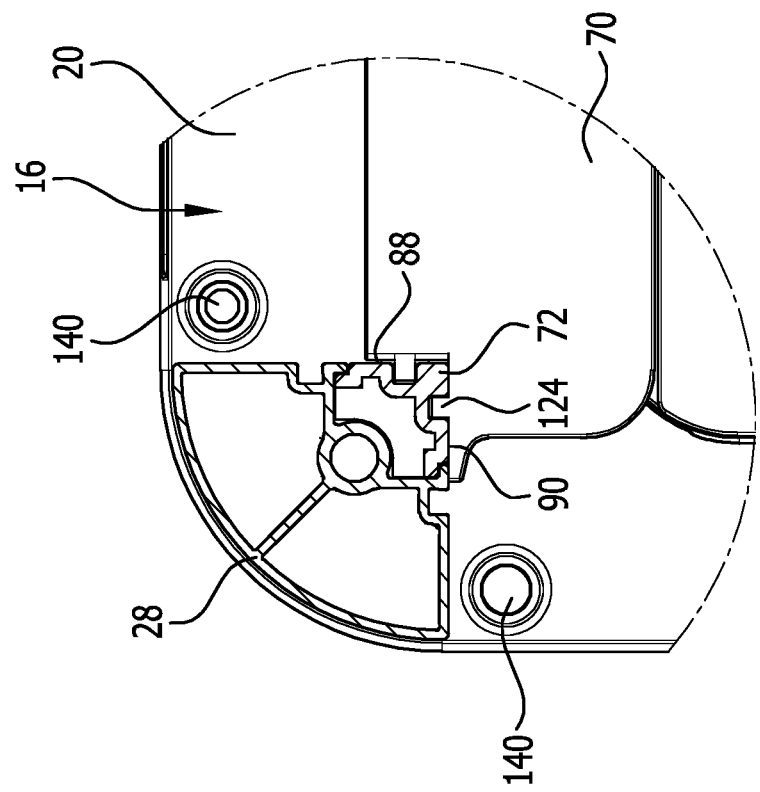
FIG. 12 illustrates an enlarged representation of detail A of FIG. 5.

The retaining element 70, at the end sections 102, 104 thereof, comprises two contact regions 122 for cooperating with the contact regions 98 at the receiving part 72. The contact regions 122 are oriented transversely to one another and are in particular perpendicularly adjacent to one another. A first contact region 122 can make area contact and flange-like contact against the side 88. A second contact region 122 can make area contact and flange-like contact against the side 90 and additionally against the projection 86 (FIGS. 11 to 13).

The retaining element 70 further comprises at least one orienting projection 124. In the present case, two orienting projections 124 are arranged at one of the contact regions 122. This is the contact region 122 which does not have the retaining projection 114 positioned therein (FIG. 10). The orienting projections 124 can engage in the groove 92 of the receiving part 72.

The retaining elements 70 can be releasably fixed to the receiving elements 74 in a user-friendly manner, by hand and without tools. Because of the multiple receiving elements 74 in the height direction 22, the possibility exists for the retaining elements 70, and hence the storage devices 48, to be fastened to the frame 16 at different elevations.

Furthermore, because of the arrangement of the receiving elements 74 on both sides, the possibility exists for the retaining elements 70 to be selectively fixed on the sides 88 and 90 of the receiving parts 72. It is thereby possible for the retaining elements to be fixed on the sides of the support part 28 in a first orientation or a second orientation of two possible orientations. These orientations are oriented transversely and in particular perpendicularly to one another and can be oriented in particular along the travel direction 34 and in the transverse direction 36.

In the present case, the retaining elements 70 are in each case used in pairs for holding the storage devices 48. The retaining elements 70 are fixed to support parts 28 arranged opposite one another, wherein the retaining element 70 at each of the end portions 102, 104 thereof is connected to one of the support parts 28. A container 58 and/or a supporting element 60 can be positioned between the retaining elements 70 in the receiving space 46.

For example, in the configuration of the cleaning cart shown in FIGS. 1 to 3, 14 and 15, the receiving space 46 is divided such that it receives two low containers 58 and one tall container 58. In addition, supporting elements 60 are received in each case.

Absent containers 58, for example, the supporting elements 60 can form intermediate shelves of the receiving space 46.

Furthermore, the possibility exists for a supporting element 60 and a container 58 underlying same to be held to a respective retaining element 70, as illustrated in the drawing. In this case, the supporting elements 60 form cover elements 126 for the containers 58, covering these substantially completely. The cover elements 126 have substantially the same cross-section as have the containers 58 at the top edges thereof.

Preferably, the possibility exists for the cover elements 126 to form covers for the containers 58 for the transport thereof outside the cleaning cart 10.

The containers 58 can be displaced from a retracted position in which they are arranged in the receiving space 46 (FIG. 2) to at least one extended position via the guide members 106. The displacement is realized on the guide members 106 of the retaining elements 70. For example, in FIG. 14, the three containers 58 are each displaced to a varying extent from the receiving space 46 to the left side 42, in the transverse direction 36.

It is advantageous for the displacement along the retaining element 70 to be possible in mutually opposite directions. For example, FIG. 15 shows the two small containers 58 as having been displaced in mutually different orientations in the transverse direction 36, namely on the one hand to the left side 42 and on the other to the right side 44.

Depending on what side of the cleaning cart 10 a door 50 is located on and/or whether or not the door 50 is open, versatile and user-friendly access is thereby provided to the contents of the containers 58.

It will be understood that this advantage can also be achieved when side walls or doors are absent from the cleaning cart.

Figure 15:
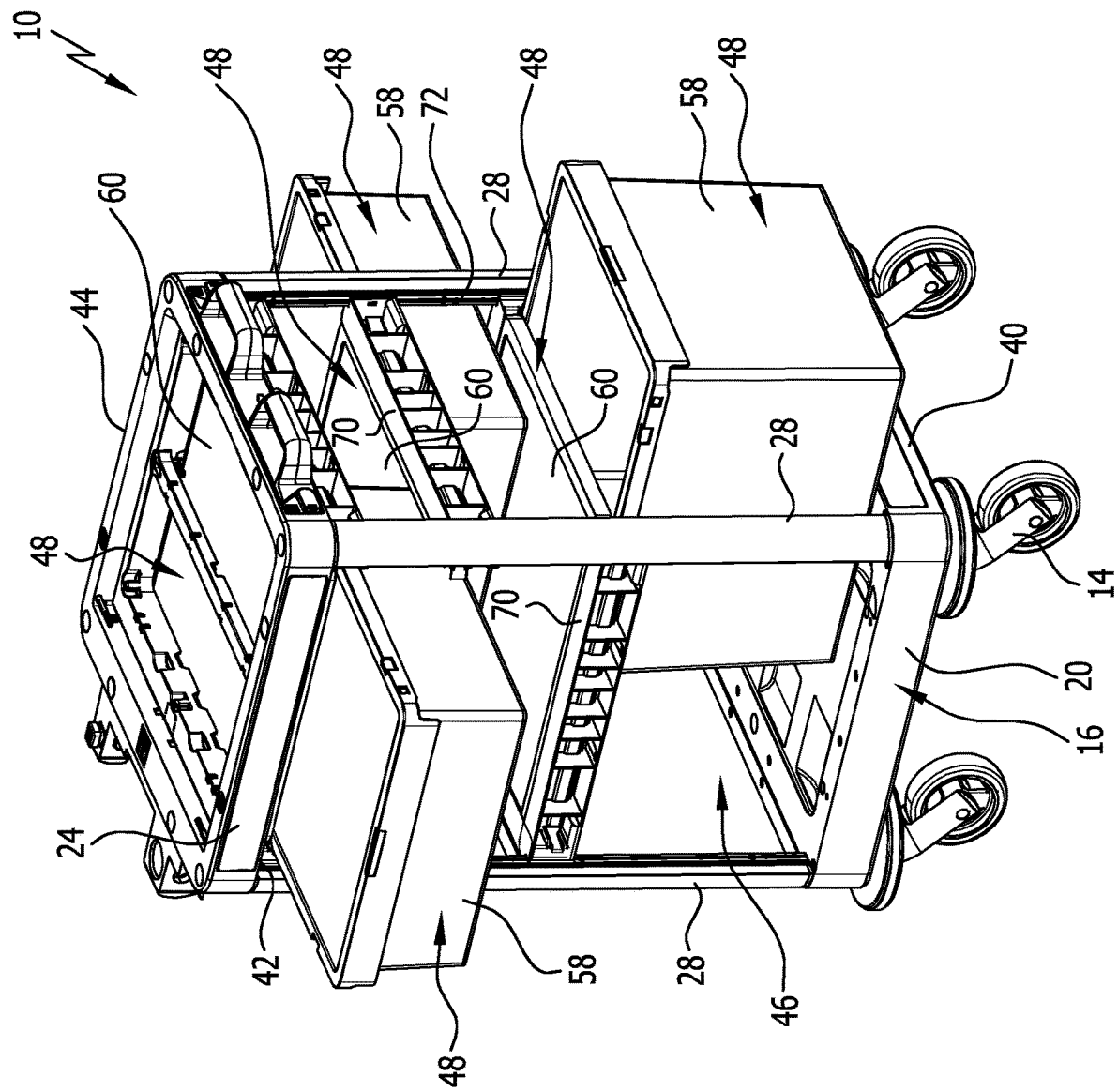
FIG. 15 illustrates a representation similar to FIG. 14, wherein the containers assume different extended positions and retaining elements for a container have a different orientation.

FIGS. 15 and 16 illustrate another configuration of the cleaning cart 10. By comparison with the original configuration, this configuration has two of the retaining elements 70 arranged at the support parts 28 in a different orientation.

Here, the retaining elements 70 are fixed to the receiving elements 74 of the respective other of the sides 88 and 90.

Depending on what orientation the retaining elements 70 are in with respect to the frame, the storage devices 48 are displaceable and extendable relative to the frame 16 in the first orientation or in the second orientation. In the present example, the two orientations are oriented transversely and in particular perpendicularly to one another.

In the present example, the orientation of the retaining elements 70 for the arrangement of the lower container 58 shown in FIG. 15 is rotated 90° by comparison with the orientation of the retaining elements 70 for the arrangement as shown in FIG. 14. This example illustrates how the lower container 58 can be moved in different directions relative to the receiving space 46 depending on the arrangement and orientation of the retaining elements 70.

Absent side walls or with doors open, in the arrangement of FIG. 15, displacement can be realized along the travel direction 34. In this case as well, displacement from the retracted position into two extended positions in mutually opposite directions is possible.

FIG. 16 shows the cleaning cart 10 assembled in a different configuration from FIG. 15, wherein in this case two large containers 58 are used. In this case, for example, the pair of retaining elements 70 for one of the small containers 58 can be removed from the receiving parts 72.

The drawing shows only the containers 58 as being displaced. However, the possibility exists for the supporting elements 60 to be also displaced from a retracted position to different extended positions. Here, the displacement is realized along the guide members 110.

As can be seen from FIGS. 19 to 22 in particular, the door 50, already mentioned, comprises a door wall 128 and two fixing parts 130 arranged a distance apart from each other in the height direction 22. The fixing parts 130 are of strip-shaped configuration and receive the door wall 128 therebetween. A tension element 132 is placed in compression and tensions the fixing parts 130 in place relative to one another.

A pin-like bearing element 134 is arranged on an end side of each fixing part 130. The bearing element 134 is received in a sleeve 136 and is biased against the frame 16 by way of a biasing element 138, in the present case a helical spring, arranged in the sleeve 136.

Corresponding bearing elements 140 in the form of engagement openings are arranged at the frame lower part 20 and at the frame upper part 24 (FIGS. 17 and 18).

The bearing elements 134 of the two fixing parts 130 are in engagement with the bearing elements 140 in order to define a pivot axis 142 for the door 50.

The fastening mechanism for the door 50 is preferably of identical or functionally equivalent configuration to the fastening mechanism for the retaining elements 70.

The door 50 can be transferred from a closed position in which it closes off the receiving space 46 on one side, to an open position in which a user is afforded access to the receiving space 46, and the storage devices 48 in particular.

Figure 22:
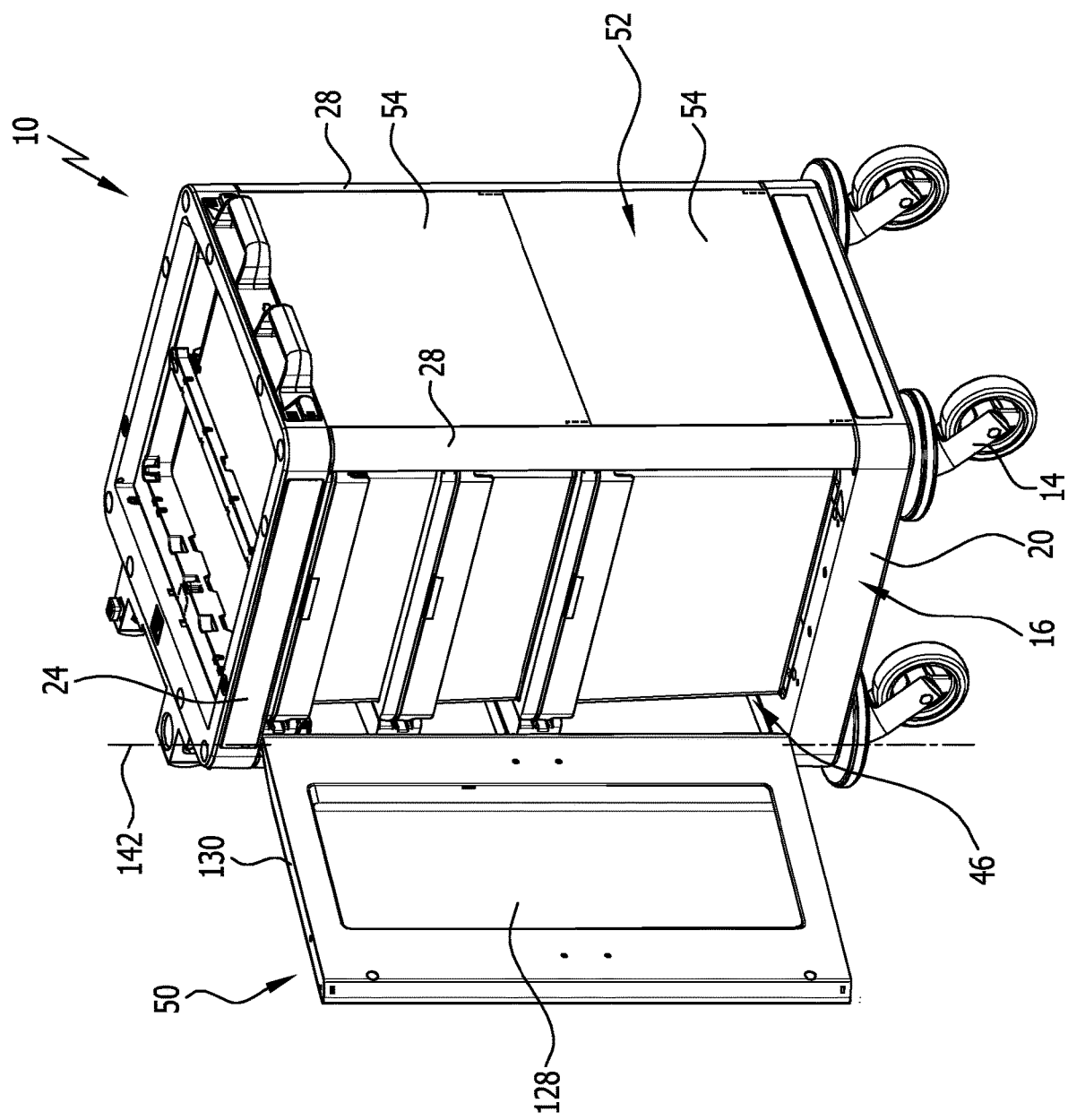
FIG. 22 illustrates a representation similar to FIG. 19, wherein the door is hinged to the cleaning cart on a different side and is shown in an open position.

The bearing elements 140 are duplicated for each of the sides 38 to 44 and are arranged at two positions. This gives the possibility of fixing the door 50 on each of the sides 38 to 44 at two positions in different orientations on the frame 16. This is illustratively shown in FIG. 22 in which, by comparison with FIG. 19, the door is hinged on a different side. Here, the door 50, on the left side 42, is on the one hand displaced from a location near the rear side 40 to a location near the front side 38 and, on the other hand, rotated about a horizontal axis extending in the transverse direction 36. FIG. 22 illustrates the door 50 in an open position.

Figure 23:
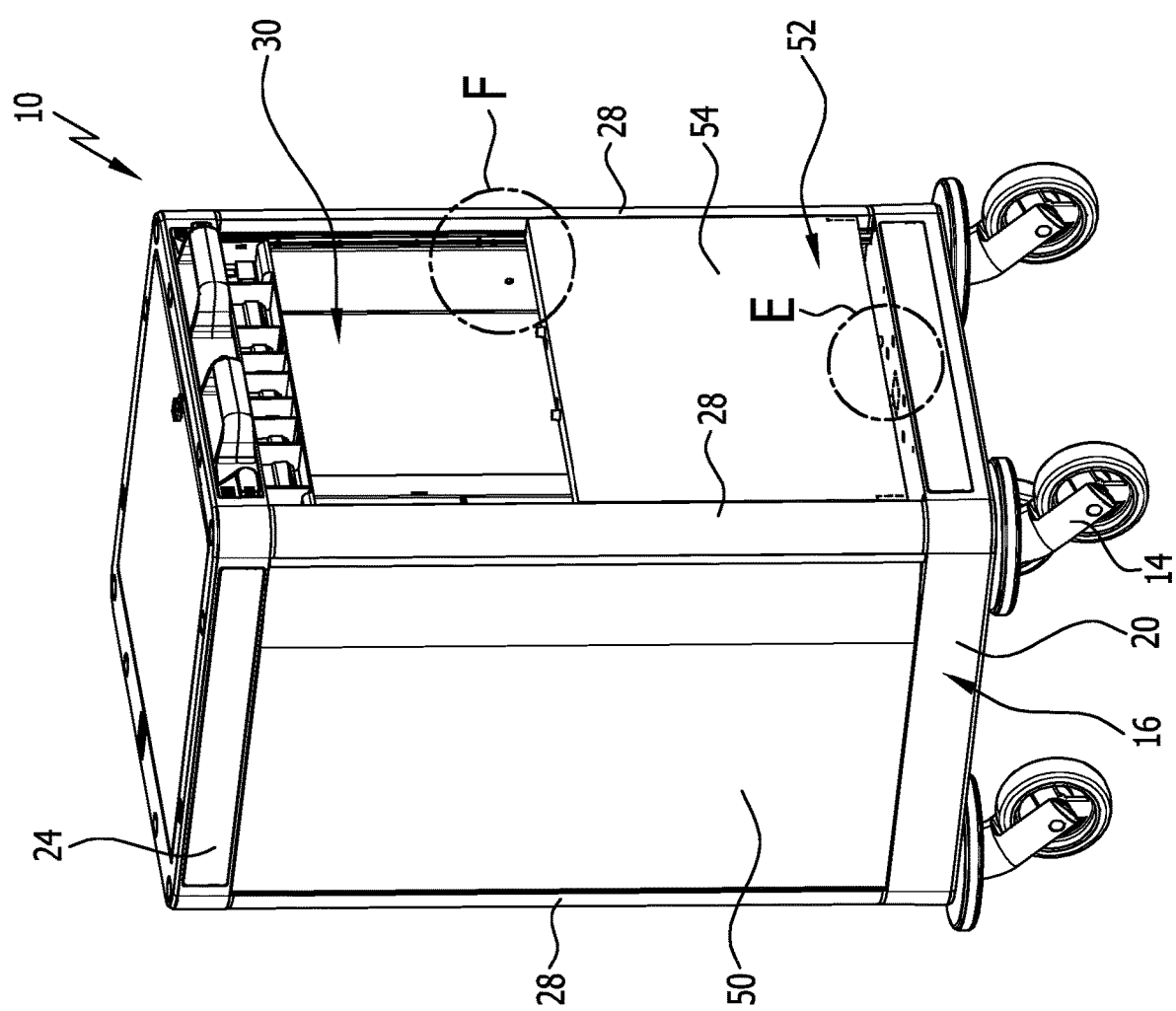
FIG. 23 illustrates another representation of the cleaning cart of FIG. 1, wherein a segment of a side wall has been removed and another segment of the side wall is shown as having been displaced.
Figure 25:
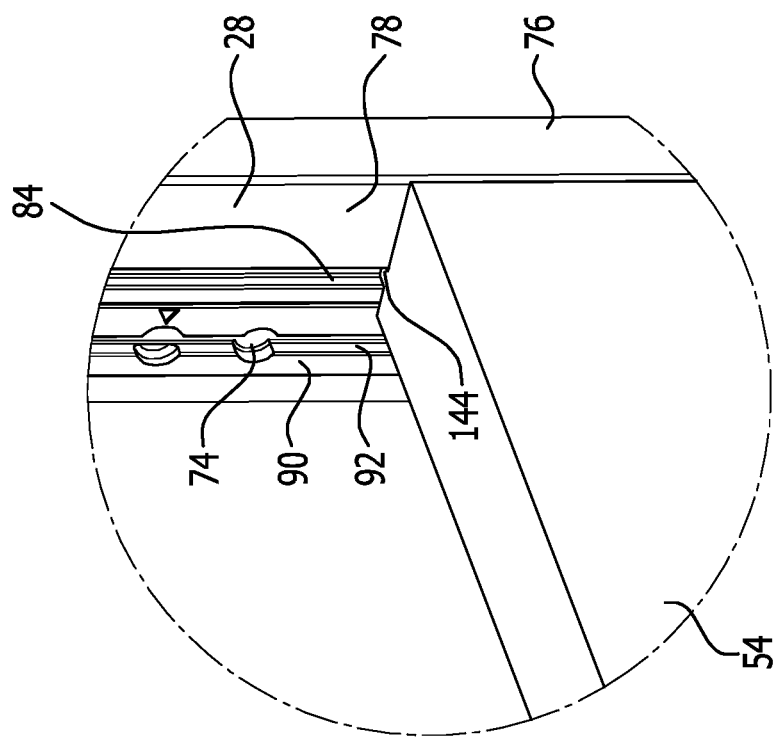
FIG. 25 illustrates an enlarged representation of detail F of FIG. 23.
Figure 24:
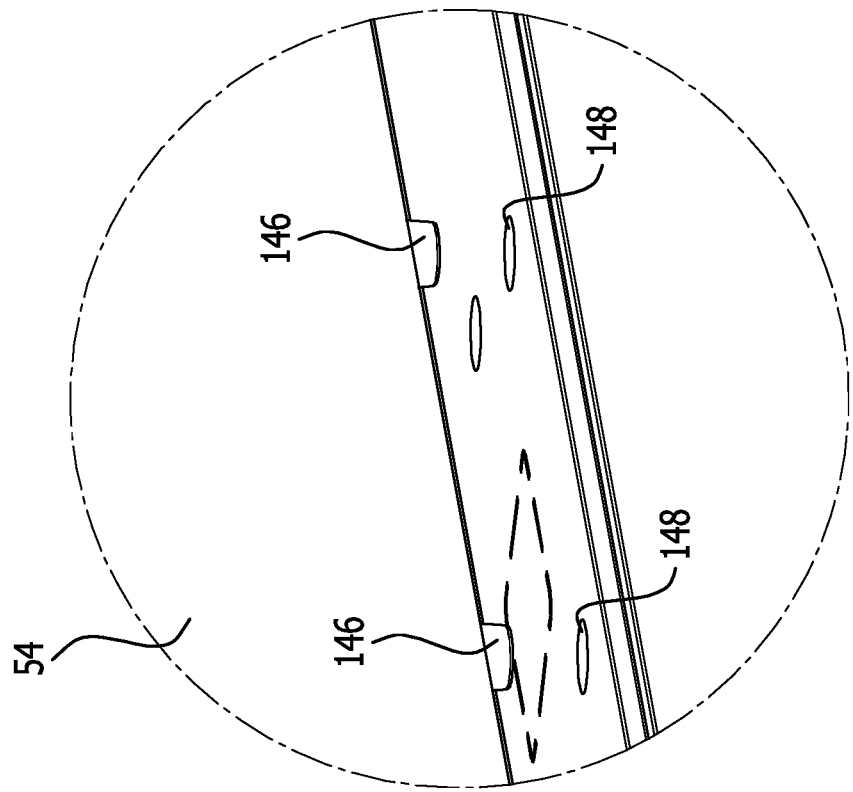
FIG. 24 illustrates an enlarged representation of detail E of FIG. 23.

The segments 54 of the side wall 52 can be held to the support parts 28 using simple structure (FIGS. 23 to 25). To this end, strip-shaped projections 144 are arranged at the segments 54 on sides thereof facing away from one another. The projections 144 can engage in the grooves 84 (FIG. 25). For example, the segments 54 are slid into the support parts 28 from the top before mounting the frame upper part 24.

In a direction towards the frame lower part 20 and the frame upper part 24, a respective segment 54 has at least one projection 146 (in the present case two in number) which engages in a corresponding engagement opening 148 at the frame lower part 20 and at the frame upper part 24. This is shown in FIGS. 23 and 24 in a segment 54 that is displaced somewhat in the height direction 22. By virtue of the engagement of the projections 146 in the engagement openings 148, the segments 54 are prevented from rattling, which has proven to make the cleaning cart 10 comfortable to work with.

Preferably, the segments 54 themselves are also in engagement one with the other. By way of example, corresponding projections and engagement openings at a respective segment 54 are shown in FIG. 23.

The segments 54, like the doors 50, can be attached to each of the sides 38 to 44.

In the following, further preferred embodiments of the cleaning cart in accordance with the invention will be discussed. The advantages that have already been described in the context of the cleaning cart 10 can also be achieved with these cleaning carts. To avoid repetition, reference may be had to what has been described in the foregoing. Only the essential differences will be discussed.

The same reference numerals are used for features and components that are identical or functionally equivalent.

Figure 26:
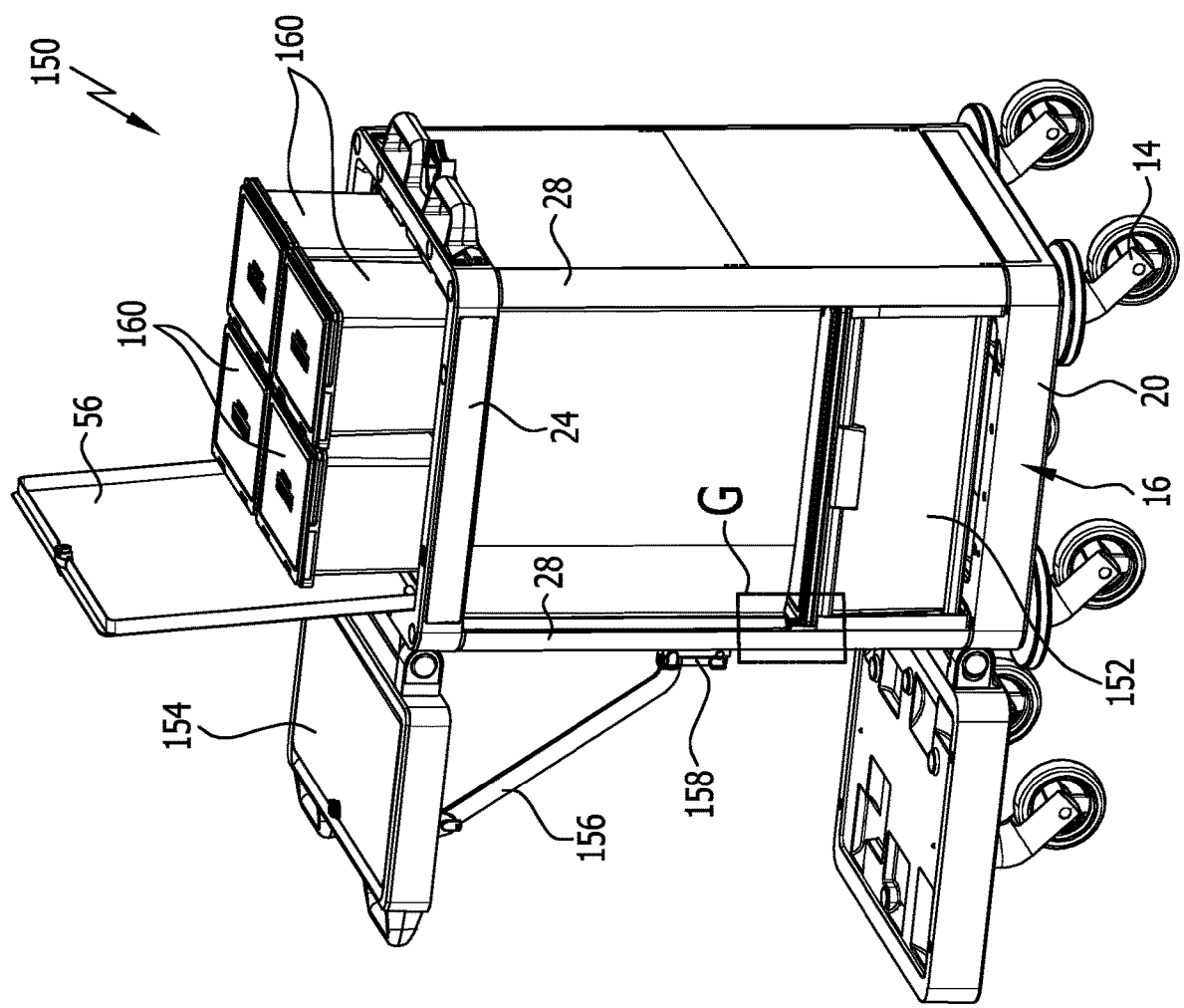
FIG. 26 illustrates, in perspective representation, a further preferred embodiment of the cleaning cart in accordance with the invention.

A cleaning cart 150 as shown in FIG. 26 is also provided with a door 50. The door 50 has an extension in the height direction 22 which is less than the distance of the frame lower part 20 from the frame upper part 24. A drawer 152 is positioned underneath the door 50, in the receiving space 46. In the cleaning cart 150, a bearing element which corresponds to the bearing element 134 is arranged at one of the retaining elements 70; this can be seen from FIG. 27 in particular. By way of example, the bearing element 140 is formed integrally on one of the end sections 102, 104.

Furthermore, in the cleaning cart 150, at a top side thereof, a supporting element 154 is provided which is connected to the frame upper part. The supporting element 154 is connected to the frame 16 via strut elements 156. One of these strut elements 156 is shown in FIG. 26 of the drawing.

A retaining part 158 is used for connecting the strut element 156. The retaining part 158 engages the strut element 156 and is connected to the receiving part 72 by way of screwing, for example (FIG. 28).

In the cleaning cart 150, the top wall 56 is illustrated in open position. A supporting element 60 is positioned such that containers 160 can be supported thereon and protrude upwardly from the receiving space 46 through the reach-through opening 26. In this way, the containers 160 can be accessed by the user in an easy-to-handle manner.

Figure 29:
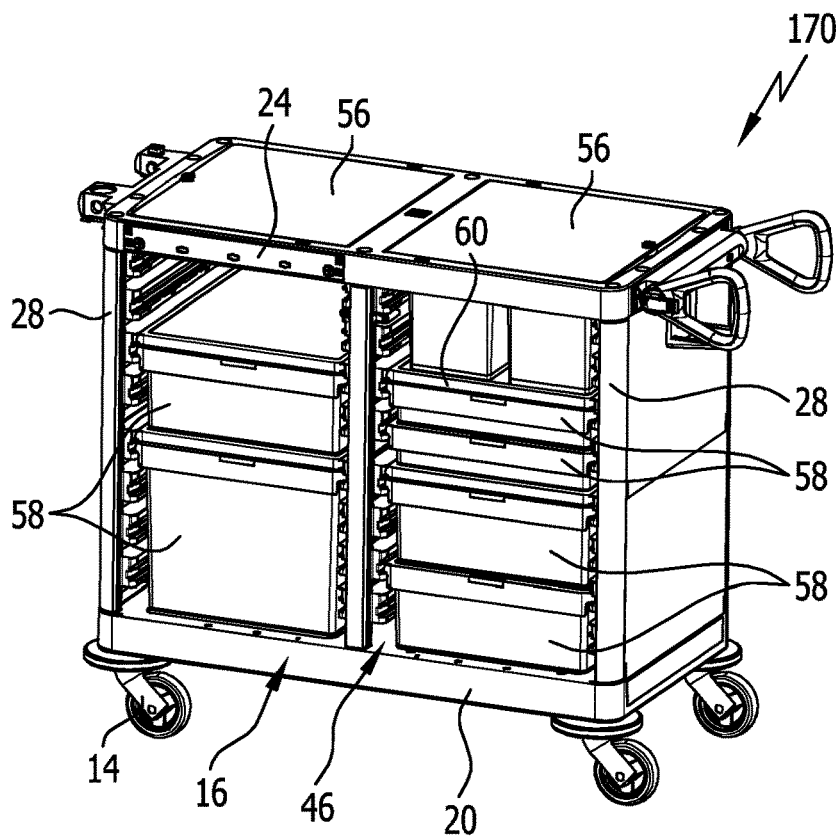
FIGS. 29 and 30 illustrate perspective representations of a further preferred embodiment of the cleaning cart in accordance with the invention.
Figure 30:
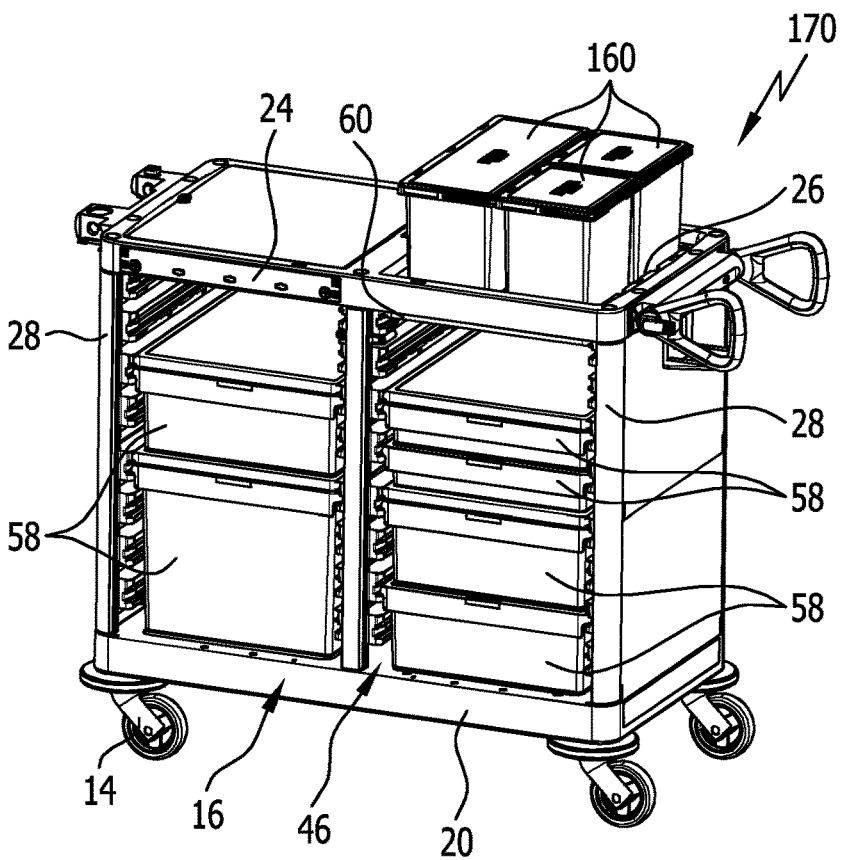

FIGS. 29 and 30 show a cleaning cart in accordance with the invention, generally designated by the reference numeral 170, in a preferred embodiment.

In the present case, the cleaning cart 170 has no doors arranged on the left side 42 thereof.

Containers 58 of various sizes are received in the receiving space 46. In particular, here, containers 58 are provided whose extensions in the height direction 22 form ratios of powers of two.

The cleaning cart 170 comprises two containers 58 of low height, three containers 58 that are each twice the aforesaid height, and one container 58 that is, again, twice the aforesaid height.

Also shown in FIGS. 29 and 30 is that surplus retaining elements 70 are fixed to the receiving parts 72 and are, in this case, unused. In particular, a grid of retaining elements 70 is provided in the height direction 22 which can be assembled with containers 58 and supporting elements 60 as desired.

In the configuration shown in FIG. 29, a supporting element 60 is provided on which cleaning utensils in the form of containers 160 are positioned. The supporting element 60 here is arranged such that the containers 160 are covered at the top sides thereof when the top wall 56 is closed (FIG. 29).

FIG. 30, on the other hand, represents a different configuration of the cleaning cart 170. In this case, the top wall 56 has been removed, exposing the reach-through opening 26. As in the case of the cleaning cart 150, the supporting element 60 is positioned sufficiently high for the containers 160 to protrude through the reach-through opening 26, thereby bringing them within easier reach of the user.

In the configuration in accordance with FIG. 29, for example, provision could be made for the top wall 56 arranged above the containers 160 to be opened, for example by pivoting as in the case of the cleaning cart 150. In this case, the user can access the containers 160 through the reach-through opening 26.

Figure 31:
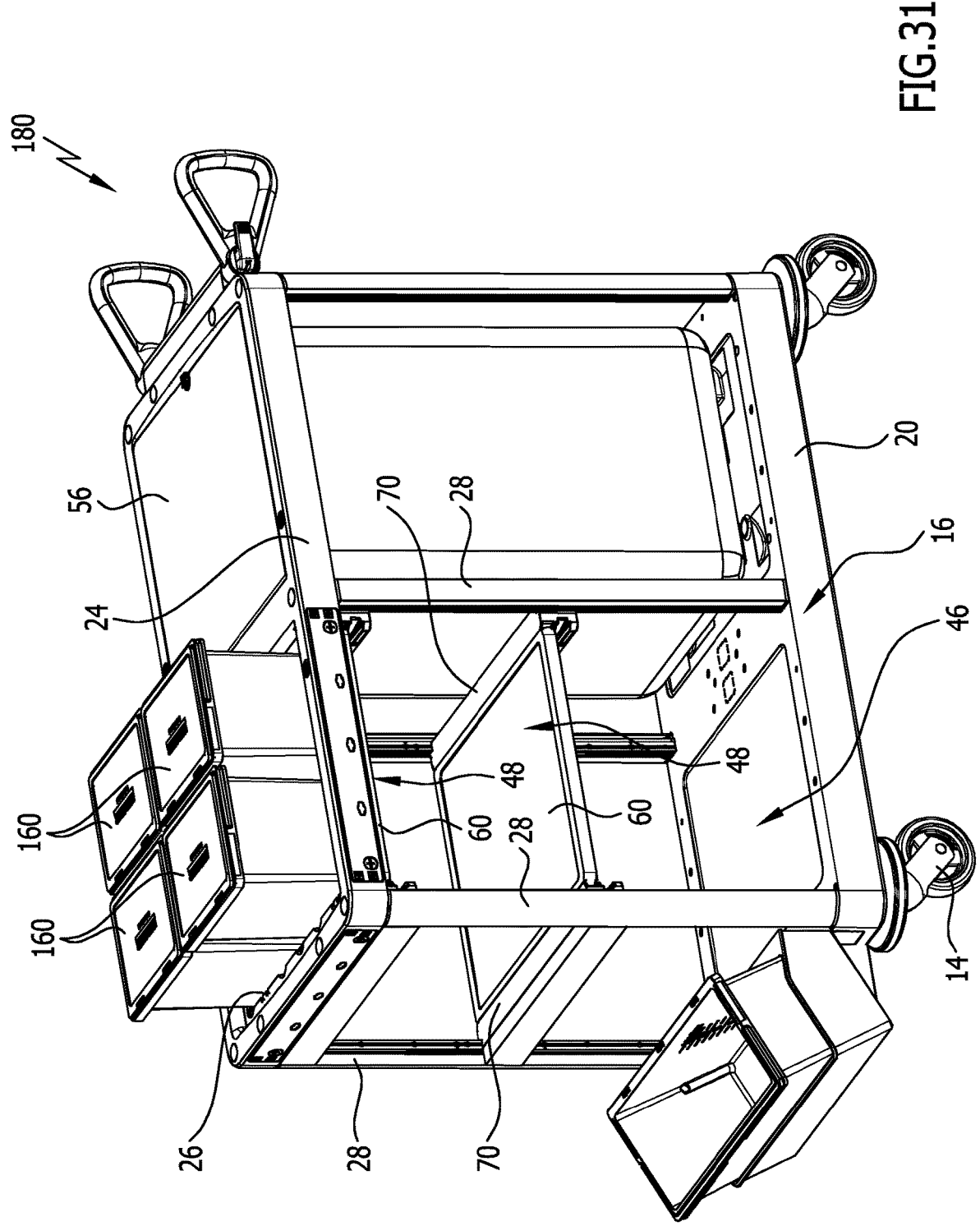
FIG. 31 illustrates a perspective representation of a further preferred embodiment of the cleaning cart in accordance with the invention.

FIG. 31 shows a cleaning cart in accordance with the invention, designated by the reference numeral 180, in a preferred embodiment.

In the cleaning cart 180, absent a corpus 18, the frame 16 is open. In addition, the containers 58 are omitted.

In this case, provided in the receiving space 46 are only supporting elements 60, which can have cleaning utensils positioned thereon. For example, one supporting element 60 is positioned as an intermediate shelf and, as in the case of the cleaning carts 150, 170, a further supporting element 60 is positioned on the top side for receipt of containers 160.

By utilizing the retaining elements 70 with guide members 106 for the containers 58, the cleaning cart 180 can easily be configured for receipt of containers 58 when needed.

LIST OF REFERENCE CHARACTERS 10 cleaning cart
12 ground surface
14 roller
16 frame
18 corpus
20 frame lower part
22 height direction
24 frame upper part
26 reach-through opening
28 support part
30 receiver
32 handle device
34 travel direction
36 transverse direction
38 front side
40 rear side
42 left side
44 right side
46 receiving space
48 storage device
50 door
52 side wall
54 segment
56 top wall
58 container
60 supporting element
62 retaining projection
64 handle element
66 rim
68 depression
70 retaining element
72 receiving part
74 receiving element
76 arcuate section
78 section
80 connecting section
82 receiver
84 groove
86 projection
88 first side
90 second side
92 groove
94 projection
96 engagement opening
98 contact region
100 pullout guide
102 end section
104 end section
106 guide member
108 groove
110 guide member
112 groove
114 retaining projection
116 sleeve
118 biasing element
120 actuating member
122 contact region
124 orienting projection
126 cover element
128 door wall
130 fixing part
132 tension element
134 bearing element
136 sleeve
138 biasing element
140 bearing element
142 pivot axis
144 projection
146 projection
148 engagement opening
150 cleaning cart
152 drawer
154 supporting element
156 strut element
158 retaining part
160 container
170 cleaning cart
180 cleaning cart

What is claimed is:

1. Cleaning cart, comprising:
a frame having a frame lower part, a frame upper part and support parts which connect the frame lower part to the frame upper part and are spaced apart from one another, rollers at the frame lower part for moving on a ground surface,
storage devices for at least one of receiving therein and supporting thereon cleaning accessories,
retaining elements for holding the storage devices,
and receiving elements arranged at the support parts in a predefined position,
wherein the retaining elements are selectively fixable to the receiving elements for having the storage devices assume different relative positions with respect to the support parts,
wherein the storage devices are extendable relative to the frame along two directions oriented transversely to one another, depending on the orientation of the retaining elements relative to the frame.

2. Cleaning cart in accordance with claim 1, wherein a plurality of receiving elements are provided in spaced relation to one another in a height direction of the cleaning cart, and wherein the retaining elements are selectively fixable at different positions in the height direction.

3. Cleaning cart in accordance with claim 1, wherein the receiving elements are arranged equidistantly from one another in the height direction.

4. Cleaning cart in accordance with claim 1, wherein, at the support parts, receiving elements are provided which are arranged on two sides, oriented transversely to one another, of the support parts, and wherein the retaining elements are selectively fixable to a receiving element on a first side or to a receiving element on a second side of the two sides, with respect to different orientations of the retaining elements relative to the support part.

5. Cleaning cart in accordance with claim 4, wherein at least one of the following applies:
- two orientations are provided, these being oriented transversely to one another, wherein a respective orientation defines a pullout direction for an extendable storage device;
- the receiving elements arranged on the two sides arranged transversely to one another are arranged at the same position in a height direction of the cleaning cart.

6. Cleaning cart in accordance with claim 1, wherein the storage devices are or comprise containers which have or form a receiving space for cleaning utensils.

7. Cleaning cart in accordance with claim 6, wherein at least two containers have different heights along a height direction of the cleaning cart and/or are of identical cross-section in a direction transverse to the height direction.

8. Cleaning cart in accordance with claim 6, wherein extensions of the containers in the height direction have ratios to each other that are given by powers of two, or wherein the extensions of the containers in the height direction are integer multiples of each other.

9. Cleaning cart in accordance with claim 1, wherein the storage devices comprise plate-shaped or substantially plate-shaped supporting elements having a respective supporting surface for cleaning utensils.

10. Cleaning cart in accordance with claim 9, wherein the supporting elements are intermediate shelves or dividing shelves of a receiving space of the cleaning cart.

11. Cleaning cart in accordance with claim 9, wherein at least one supporting element forms a cover element for a container.

12. Cleaning cart in accordance with claim 11, wherein cross-sections of the supporting element and of the container in a direction transverse to a height direction of the cleaning cart are identical or substantially identical in order to completely or substantially completely cover the container.

13. Cleaning cart in accordance with claim 9, wherein a supporting element and a container underlying same in a height direction are holdable to at least one retaining element, wherein the supporting element directly covers the container.

14. Cleaning cart in accordance with claim 1, wherein the cleaning cart comprises a marking device for marking the storage devices.

15. Cleaning cart in accordance with claim 1, wherein the retaining elements are or comprise pullout guides, each of which has at least one guide member for the storage devices, wherein a respective storage device is displaceable along the guide member from a retracted position to at least one extended position and vice versa.

16. Cleaning cart in accordance with claim 15, wherein at least one of the following applies:
- the storage device is configured for assuming two extended positions and is transferrable along the guide member starting from the retracted position in two mutually opposite directions to a respective extended position;
- the storage devices comprise retaining projections which engage in the guide members.

17. Cleaning cart in accordance with claim 16, wherein the respective storage device is latchable with the guide member when in at least one of the retracted position and the at least one extended position.

18. Cleaning cart in accordance with claim 1, wherein the receiving elements are arranged on respective sides of the support parts that face towards another support part, spaced apart from the support part.

19. Cleaning cart in accordance with claim 18, wherein at two support parts arranged a distance apart from each other receiving elements are arranged at the support parts in opposing relation to one another.

20. Cleaning cart in accordance with claim 1, wherein at least one of the following applies:
- a respective retaining element is holdable at end sections thereof facing away from each other to two support parts spaced apart from each other;
- the retaining elements in each case are arranged in pairs, wherein a retaining element arranged at the frame in a height direction of the cleaning cart is associated with a corresponding retaining element in opposing relation thereto at the frame.

21. Cleaning cart in accordance with claim 1, wherein the support parts comprise or form the receiving elements, preferably wherein the receiving elements are formed in one piece with the support parts.

22. Cleaning cart in accordance with claim 1, wherein the cleaning cart comprises receiving parts comprising the receiving elements, which receiving parts are formed separately from the support parts and are connected to the respective support parts.

23. Cleaning cart in accordance with claim 22, wherein a plurality of receiving elements are arranged at the respective receiving part.

24. Cleaning cart in accordance with claim 22, wherein the support parts are configured as profile parts and/or wherein the receiving parts are of strip-shaped configuration.

25. Cleaning cart in accordance with claim 22, wherein at least one of the following applies:
- the receiving parts are fixed to the respective support part by at least one of a force-locking and a form-locking connection;
- the receiving parts are fixable to the respective support part at least one of by hand and without tools;
- the receiving parts are slidable into the respective support part.

26. Cleaning cart in accordance with claim 1, wherein at least one retaining element comprises two contact regions oriented transversely to each other and arranged adjacent to each other, the retaining element being in surface contact against corresponding contact regions of the support part or of a receiving part comprising the receiving elements.

27. Cleaning cart in accordance with claim 1, wherein at least one of the following applies:
- the retaining elements are fixable to the receiving elements by at least one of a force-locking and form-locking connection;
- the retaining elements are releasably fixable to the receiving elements;

the retaining elements are at least one of fixable to and releasable from the receiving elements at least one of by hand and without tools.

28. Cleaning cart in accordance with claim 1, wherein the retaining elements and the receiving elements comprise retaining projections and corresponding engagement openings for the retaining projections which are in engagement with one another when in a connecting position.

29. Cleaning cart in accordance with claim 28, wherein at least one of the following applies:
the retaining projections are arranged at the retaining elements, and the receiving elements comprise or form the engagement openings;
biasing elements are provided against whose action the retaining projections are bringable out of engagement with the engagement openings.

30. Cleaning cart in accordance with claim 1, wherein the retaining elements and the receiving elements comprise orienting projections and corresponding grooves for the orienting projections, these being in engagement with each other in the connected state of the retaining elements with the receiving elements.

31. Cleaning cart in accordance with claim 1, wherein the cleaning cart comprises at least one door which is transferable from a closed position to an open position and vice versa.

32. Cleaning cart in accordance with claim 31, wherein the door comprises a door wall and fixing parts between which the door wall is held or arranged, and wherein the fixing parts are pivotably held, directly or indirectly, to the frame via bearing elements.

33. Cleaning cart in accordance with claim 32, wherein a corresponding bearing element for a bearing element at the fixing part is arranged or formed at at least one of the following:
at the frame lower part;
at the frame upper part;
at at least one retaining element.

34. Cleaning cart in accordance with claim 32, wherein the door is attachable to the cleaning cart in two different orientations and positions in which the door, rotating about parallel pivot axes in directions pointing away from each other relative to the frame, is transferable to the open position, wherein different bearing elements are provided at at least one of the frame lower part and the frame upper part, and/or wherein at least one different retaining element having a respective bearing element is provided for this purpose.

35. Cleaning cart in accordance with claim 1, wherein arranged at the frame upper part is a top wall which is transferable from a closed position to an open position and/or which is removable from the frame upper part.

36. Cleaning cart in accordance with claim 1, wherein the cleaning cart is hand-guided and comprises a handle device graspable by a user.

\* \* \* \* \*